US012686806B2

(12) United States Patent
Pearl, Jr. et al.

(10) Patent No.: US 12,686,806 B2
(45) Date of Patent: Jul. 21, 2026

(54) WIDE RANGE RETARDER THAT IMPROVES EARLY COMPRESSIVE STRENGTH DEVELOPMENT

(71) Applicant: Halliburton Energy Services, Inc., Houston, TX (US)

(72) Inventors: William Cecil Pearl, Jr., Houston, TX (US); Samuel J. Lewis, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 18/930,404

(22) Filed: Oct. 29, 2024

(65) Prior Publication Data

US 2026/0117112 A1 Apr. 30, 2026

(51) Int. Cl.

| | |
|---|---|
| ***C09K 8/467*** | (2006.01) |
| ***C04B 24/08*** | (2006.01) |
| ***C04B 28/02*** | (2006.01) |
| ***C04B 103/22*** | (2006.01) |
| ***C04B 103/40*** | (2006.01) |
| ***C04B 111/00*** | (2006.01) |
| ***E21B 33/14*** | (2006.01) |

(52) U.S. Cl.

CPC ............ *C09K 8/467* (2013.01); *C04B 24/085* (2013.01); *C04B 28/02* (2013.01); *E21B 33/14* (2013.01); *C04B 2103/22* (2013.01); *C04B 2103/40* (2013.01); *C04B 2111/00146* (2013.01)

(58) Field of Classification Search

CPC ....... C09K 8/467; C04B 24/085; C04B 28/02; E21B 33/14

See application file for complete search history.

(56) References Cited

U.S. PATENT DOCUMENTS

| | | | | |
|---|---|---|---|---|
| 5,221,343 A * | 6/1993 | Grauer | .................... | C04B 28/04 106/729 |
| 2011/0028607 A1* | 2/2011 | Morgan | .............. | C04B 40/0039 106/692 |
| 2017/0037301 A1 | 2/2017 | Alwattari | | |

(Continued)

FOREIGN PATENT DOCUMENTS

| | | |
|---|---|---|
| CN | 113321439 A | 8/2021 |
| CN | 115485252 A | 12/2022 |
| EP | 2925829 B1 | 8/2017 |

OTHER PUBLICATIONS

Foreign Communication from Related Application—International Search Report and Written Opinion of the International Searching Authority, International Application No. PCT/US2024/056680, dated Jul. 17, 2025, 9 pages.

*Primary Examiner* — Crystal J Lee
(74) *Attorney, Agent, or Firm* — Conley Rose, P.C.; Rodney B. Carroll

(57) ABSTRACT

A cement composition comprising an aqueous fluid, a cement, and a cement retarder. The cement retarder comprises a biosurfactant, and is operable to retard cement thickening of the cement composition, relative to a same cement composition absent the cement retarder, over a temperature range of from about 40° F. (4.4° C.) to about 500° F. (260° C.), from about 40° F. (4.4° C.) to about 400° F. (204.4° C.), from about 50° F. (10° C.) to about 350° F. (176.7° C.), or from about 60° F. (15.6° C.) to about 250° F. (121.1° C.).

20 Claims, 8 Drawing Sheets

(56) References Cited

U.S. PATENT DOCUMENTS

| | | | | |
|---|---|---|---|---|
| 2021/0261459 | A1* | 8/2021 | Alibek | C04B 24/10 |
| 2024/0018409 | A1* | 1/2024 | Benkley | C04B 28/02 |
| 2024/0116814 | A1* | 4/2024 | Alibek | C04B 24/10 |

* cited by examiner

WIDE RANGE RETARDER THAT IMPROVES EARLY COMPRESSIVE STRENGTH DEVELOPMENT

CROSS-REFERENCE TO RELATED APPLICATIONS

None.

STATEMENT REGARDING FEDERALLY SPONSORED RESEARCH OR DEVELOPMENT

Not applicable.

BACKGROUND

The present disclosure relates generally to cementing operations, and more particularly, to the use of a cement retarder comprising a biosurfactant, such as a glycolipid (e.g., a sophorolipid).

BRIEF DESCRIPTION OF THE DRAWINGS

Illustrative examples of the present disclosure are described in detail below with reference to the attached drawing figures, which are incorporated by reference herein, wherein like reference numerals represent like parts and wherein.

Figure 1:
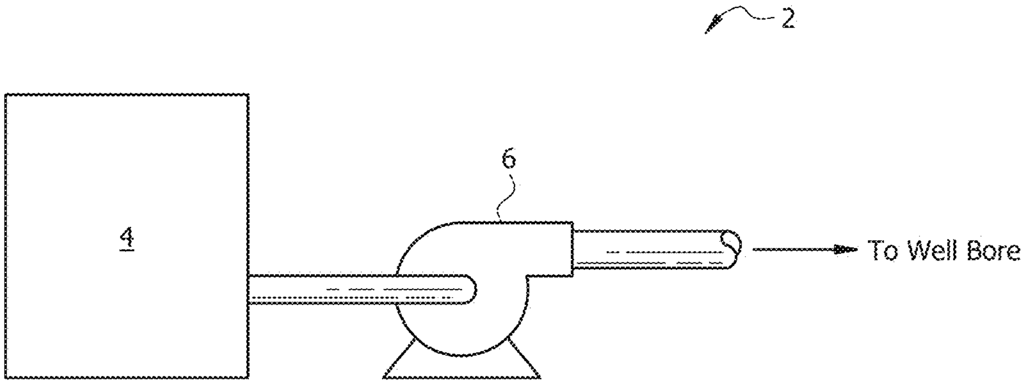
FIG. 1 is a schematic illustrating pumping and mixing equipment for cementing with a retarded cement composition in accordance with one or more examples described herein.

The illustrated figures are only exemplary and are not intended to assert or imply any limitation with regard to the environment, architecture, design, or process in which different examples may be implemented.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

It should be noted that when "about" is used herein at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, particle sizes, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the illustrative embodiments described herein. At the very least, and not as an attempt to limit the application of the doctrine of equivalents to the scope of the claim, each numerical parameter should at least be construed in light of the number of reported significant digits and by applying ordinary rounding techniques. The term "about" as used herein can thus allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "downhole" as used herein refers to under the surface of the earth, such as a location within or fluidly connected to a wellbore.

If there is any conflict in the usages of a word or term in this specification and one or more patent or other documents that may be incorporated herein by reference, the definitions that are consistent with this specification should be adopted.

Cement compositions can be used in a variety of subterranean operations. For example, in subterranean well construction, a pipe string (e.g., casing, liners, expandable tubulars, etc.) can be run into a wellbore and cemented in place. The process of cementing the pipe string in place is commonly referred to as "primary cementing." In a typical primary cementing method, a cement composition can be pumped into an annulus between the walls of the well bore and the exterior surface of the pipe string disposed therein.

The cement composition can set in the annular space, thereby forming an annular sheath of hardened, substantially impermeable cement (i.e., a cement sheath) that can support and position the pipe string in the wellbore and can bond the exterior surface of the pipe string to the subterranean formation. Among other things, the cement sheath surrounding the pipe string functions to prevent the migration of fluids in the annulus, as well as protect the pipe string from corrosion. Cement compositions also can be used in remedial cementing methods, for example, to seal cracks or holes in pipe strings or cement sheaths, to seal highly permeable formation zones or fractures, to place a cement plug, and the like.

Subterranean cementing operations generally occur under a wide variety of wellbore conditions ranging from shallow wells (less than about 1,000 feet) to extremely deep wells (greater than about 35,000 feet). A cement retarder can be included in a cement composition to retard the set time of the cement composition until the cement composition has reached its ultimate location within the subterranean formation. Some cement retarders can be produced from the chemical modification of a natural starting material, can be entirely synthetic and produced from chemical manufacturing techniques, or can be chemically purified from a starter material. Some of these chemical processes can add to the carbon footprint of the cement retarder and increase production costs. Additionally, some cement retarders can lack suspension properties and/or can be unsuitable for use in some wellbore environments such as low temperature wellbores.

Regardless, the successful retardation of the cement composition is important to help prevent premature setting and to help ensure a desired placement. The present invention provides improved methods and compositions for retarding a cement composition.

The present disclosure relates generally to cementing operations, and more particularly, to the use of a cement retarder comprising a glycolipid, such as a sophorolipid. Glycolipids, such as sophorolipids, are a type of biosurfactant based on a sugar molecule. It has been unexpectedly discovered that this type of molecule can work very effectively as a cement retarder across a wide temperature range without hurting or, in embodiments, even increasing compressive strength development. Such glycolipids can thus be utilized, according to this disclosure, to replace multiple different retarders or supplement existing retarder(s), while effectively lowing the wait on cement time of the slurry.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open ended fashion, and thus should be interpreted to mean "including, but not limited to." Unless otherwise indicated, as used throughout this document, "or" does not require mutual exclusivity.

The terms uphole and downhole can be used to refer to the location of various components relative to the bottom or end of a well. For example, a first component described as uphole from a second component can be further away from the end of the well than the second component. Similarly, a first component described as being downhole from a second component can be located closer to the end of the well than the second component.

The examples described herein relate to the use of a cement retarder comprising a biosurfactant. The biosurfactant can include a glycolipid. For example, the glycolipid can be selected from surface active glycolipids, such as and without limitation, sophorolipids, alkyl polyglycosides (APGs), derivatives and/or substituted forms thereof, subgroups thereof (e.g., lactonic sophorolipids), or combinations thereof.

In embodiments, the retarder comprises a sophorolipid. Sophorolipids (SLs) are one of the representative glycolipid biosurfactants, and high yields of homogeneous product can be obtained. The sophorolipid can comprise a sophorose sugar linked to a hydroxylated fatty acid, and, as described hereinbelow, can exist in acidic or lactonic forms. In embodiments, the sophorolipid can be the product of an extracellular glycolipid mixture produced by *Candida apicola, Candida bogoriensis* or yeast strains such as *Starmerella bombicola* (formerly *Candida bombicola*), *Candida riodocensis Candida stellate*, and *Wickerhamiella domercqiae*, for example grown on carbohydrates and lipophilic substrates with titers over 400 g/L. The molecular structure of sophorolipids typically comprises a hydrophobic fatty acid tail of 16 or 18 carbon atoms and a hydrophilic carbohydrate head sophorose, and can be divided into two main forms: an acidic form (Structure 1) (or a salt form thereof):

(Structure 1)

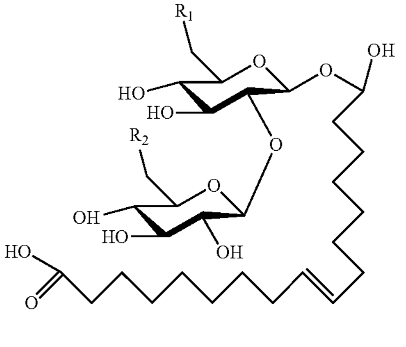

and a lactonic form (Structure 2):

(Structure 2)

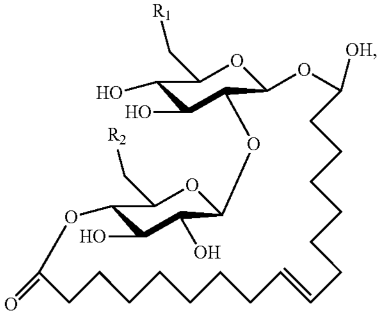

where R1=OH or $OCOCH_3$ and R2=OH or $OCOCH_3$.

Specifically, a long chain of hydroxyl fatty acid is glycosidically attached to the sophorose moiety, and the carboxylic tail of the fatty acid is either free (acidic form) or esterified at the 6'- or 6"-position (lactonic form). The variation of the structure is also reflected in the carbon number, unsaturation, and hydroxylation of the fatty acid chain in sophorolipids, depending on different kinds of carbon sources in microbial fermentation. The structural difference can affect the biological and physicochemical activities, with degree of lactonization being an important factor. In embodiments, the retarder comprises a lactonic form sophorolipid, an acidic form sophorolipid, or a combination thereof.

In embodiments, the retarder comprises a lactonic sophorolipid, which can, for example, be produced by *Candida bombicola*. As noted above, lactonic sophorolipids are a subtype of sophorolipids where the fatty acid is esterified, forming a lactone ring with the sugar Glycolipid-type biosurfactants can include alkyl polyglycosides (APGs), which can be synthesized from glucose and fatty alcohols. The retarder can comprise an APG, such as an alkyl polyglucoside comprising multiple glucose units attached to a fatty alcohol chain, such as that shown in Structure 3:

(Structure 3)

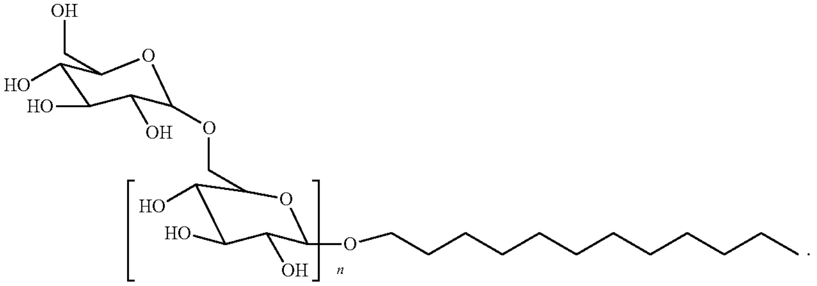

As the cement retarder comprises a biosurfactant, the cement retarder can perhaps be obtained at lower cost and provide an overall reduction in carbon footprint compared to traditional cement retarders. Generally, the cement retarder can be present in the cement composition in an amount sufficient to delay the setting of the cement composition for a desired time. Additionally, the cement retarder can assist in improving the suspension properties of the cement composition. As such, less of, or a total lack of suspending aids and/or viscosifiers may be needed to sufficiently prepare a cement composition having a suitable viscosity.

The concentration of the cement retarder in the cement composition can range from about 0.1% to about 15% by weight of cement. The concentration can range from any lower limit to any upper limit and encompass any subset between the upper and lower limits. Some of the lower limits listed can be greater than some of the listed upper limits. One skilled in the art will recognize that the selected subset can require the selection of an upper limit in excess of the selected lower limit. Therefore, it is to be understood that every range of values is encompassed within the broader range of values. For example, the concentration of the cement retarder in the cement composition can range, from about 0.1% to about 15% by weight of cement, from about 1% to about 15% by weight of cement, from about 3% to about 15% by weight of cement, from about 5% to about 15% by weight of cement, or from about 10% to about 15% by weight of cement. As another example, the concentration of the cement retarder in the cement composition can range from about 0.1% to about 15% by weight of cement, from about 0.1% to about 10% by weight of cement, from about 0.1% to about 5% by weight of cement, from about 0.1% to about 3% by weight of cement, or from about 0.1% to about 1% by weight of cement. With the benefit of this disclosure, one of ordinary skill in the art will be readily able to prepare a cement composition having a sufficient concentration of cement retarder for a given application.

As discussed further in the examples hereinbelow, it has been unexpectedly discovered that the cement retarder of this disclosure does not delay the onset of (or speeds the onset of) compressive strength (e.g., of 50, 500, or 1000 psi as measured via Ultrasonic Cement Analyzer (UCA) according to API Recommended Practice 10B-2/ISO 10426-2 section 7) or does not delay the onset of the compressive strength as much as another cement composition that is absent the biosurfactant cement retarder of this disclosure but comprises a different, conventional cement retarder and has a thickening time (defined in detail hereinbelow) within 5, 10, or 15% of the thickening time of the cement composition comprising the biosurfactant. The cement composition of this disclosure (also referred to herein as the "biosurfactant cement composition") can comprise an amount of the cement retarder comprising the biosurfactant that is less than an amount of the different cement retarder in the same cement composition that has the thickening time within 5, 10, or 15% of the thickening time of the cement composition of this disclosure. That is, for the same or similar cement retardation/thickening time, the cement composition of this disclosure can comprise substantially less (e.g., three quarters, one half, one quarter the amount of) cement retarder than an amount of conventional cement retarder needed to provide the same or similar cement retardation in an otherwise similar cement composition. In embodiments, the amount of the cement retarder of this disclosure in the cement composition of this disclosure is less 75%, 50%, or 25% of the amount of the different cement retarder in the same cement composition having the same/similar thickening time and comprising the conventional cement retarder.

The cement composition of this disclosure comprises a cement. The cement can be any cement suitable for use in subterranean applications. In some examples, cements suitable for use in surface applications (e.g., construction cements) can also be used. In some examples the cement is a hydraulic cement. A variety of hydraulic cements can be suitable for use including, but not limited to, those comprising one or more of calcium, aluminum, silicon, oxygen, and sulfur, which set and harden by reaction with water. Specific examples of hydraulic cements include, but are not limited to, Portland cements, pozzolanic cements, gypsum cements, high alumina content cements, silica cements, high alkalinity cements, slag cements, shale cements, cement kiln dust, or combinations thereof. In some examples, the hydraulic cement can comprise an API cement, such as API Classes A, B, C, G, H, J, K, and L Portland cements or equivalents thereof. The above-mentioned API cements are defined and described in API Specification for Materials and Testing for Well Cements, API Specification IOA, Twenty-Fifth Edition, 2019. Additional examples of suitable Portland cements can include those classified as ASTM Type I, II, III, IV, I/II, V, or IL.

Some examples of the cement can comprise pumice, a pozzolanic cementitious material. Generally, pumice is a volcanic rock that can exhibit cementitious properties in that it can set and harden in the presence of hydrated lime and water. The pumice can also be ground or co-ground with various types of cements or other pozzolanic materials. Generally, the pumice can have any particle size distribution as desired for a particular application. In certain embodiments, the pumice can have a d50 particle size distribution in a range of from about 1 micron to about 200 microns. The d50 values can be measured by particle size analyzers such as those manufactured by Malvern Instruments, Worcestershire, United Kingdom. In some specific examples, the pumice can have a d50 particle size distribution in a range of from about 1 micron to about 200 microns, from about 5 microns to about 100 microns, or from about 10 microns to about 25 microns. In one particular example, the pumice can have a d50 particle size distribution of about 15 microns or less. It should be appreciated that particle sizes too small can have mixability problems while particle sizes too large cannot be effectively suspended in the compositions. One of ordinary skill in the art, with the benefit of this disclosure, should be able to select a particle size for the pumice suitable for a chosen application.

Some examples of the cement can comprise slag. Slag is generally a granulated, blast furnace by-product from the production of cast iron comprising the oxidized impurities found in iron ore.

Some examples of the cement can comprise fly ash. Fly ash is a pozzolanic cementitious material. A variety of fly ash can be suitable, including fly ash classified as Class C and Class F fly ash according to American Petroleum Institute, API Specification for Materials and Testing for Well Cements, API Specification IOA, Twenty-Fifth Edition, 2019. Class C fly ash comprises both silica and lime, so it can set to form a hardened mass upon mixing with water. Class F fly ash generally does not contain a sufficient amount of lime to induce a cementitious reaction; therefore, an additional source of calcium ions is necessary for a cement composition comprising Class F fly ash. In some examples, lime can be mixed with Class F fly ash in an amount in the range of about 0.1% to about 100% by weight of the fly ash. In some instances, the lime can be hydrated lime.

Some examples of the cement can comprise a high alumina content cement. In some examples the high alumina cement comprises a calcium aluminate. The calcium aluminate can be any calcium aluminate suitable for use as a cement. The high alumina content cement can further comprise a soluble phosphate. Among other things, it is believed that the soluble phosphate should react with the high alumina content cement to form a set cement that can be resistant to carbon dioxide. For example, calcium aluminate should react with sodium polyphosphate to form a calcium phosphate cement. Any type of soluble phosphate can be included in the high alumina content cement including, but are not limited to, vitreous sodium phosphates, sodium hexametaphosphates, sodium polyphosphates, sodium dihydrogen phosphates, sodium monohydrogen phosphates, or combinations thereof. Other soluble alkali phosphates can also be suitable for use.

The concentration of the cement in the cement composition can range from about 0.5% (w/v) to about 85% (w/v). The concentration of the cement in the cement composition can range from any lower limit to any upper limit and encompass any subset between the upper and lower limits. Some of the lower limits listed can be greater than some of the listed upper limits. One skilled in the art will recognize that the selected subset can require the selection of an upper limit in excess of the selected lower limit. Therefore, it is to be understood that every range of values is encompassed within the broader range of values. For example, the concentration of the cement in the cement composition can range from about 0.5% (w/v) to about 85% (w/v), from about 1% (w/v) to about 85% (w/v), from about 5% (w/v) to about 85% (w/v), from about 10% (w/v) to about 85% (w/v), from about 15% (w/v) to about 85% (w/v), from about 20% (w/v) to about 85% (w/v), from about 25% (w/v) to about 85% (w/v), from about 30% (w/v) to about 85% (w/v), from about 35% (w/v) to about 85% (w/v), from about 40% (w/v) to about 85% (w/v), from about 45% (w/v) to about 85% (w/v), from about 50% (w/v) to about 85% (w/v), from about 55% (w/v) to about 85% (w/v), from about 60% (w/v) to about 85% (w/v), from about 65% (w/v) to about 85% (w/v), from about 70% (w/v) to about 85% (w/v), from about 75% (w/v) to about 85% (w/v), or from about 80% (w/v) to about 85% (w/v). As another example, the concentration of the cement in the cement composition can range from about 0.5% (w/v) to about 85% (w/v), from about 0.5% (w/v) to about 80% (w/v), from about 0.5% (w/v) to about 75% (w/v), from about 0.5% (w/v) to about 70% (w/v), from about 0.5% (w/v) to about 65% (w/v), from about 0.5% (w/v) to about 60% (w/v), from about 0.5% (w/v) to about 55% (w/v), from about 0.5% (w/v) to about 50% (w/v), from about 0.5% (w/v) to about 45% (w/v), from about 0.5% (w/v) to about 40% (w/v), from about 0.5% (w/v) to about 35% (w/v), from about 0.5% (w/v) to about 30% (w/v), from about 0.5% (w/v) to about 25% (w/v), from about 0.5% (w/v) to about 20% (w/v), from about 0.5% (w/v) to about 15% (w/v), from about 0.5% (w/v) to about 10% (w/v), from about 0.5% (w/v) to about 5% (w/v), or from about 0.5% (w/v) to about 1% (w/v). With the benefit of this disclosure, one of ordinary skill in the art will be able to prepare a cement composition having a sufficient concentration of cement for a given application.

The cement composition comprises an aqueous fluid. The aqueous fluid can be from any source, provided that it does not contain an excess of compounds that can undesirably affect other components in the cement composition. In various examples, the aqueous fluid can comprise fresh water, salt water, seawater, brine, or an aqueous salt solution. In some examples, the aqueous fluid can comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like.

The concentration of the aqueous fluid in the cement composition can range from about 0.5% (w/v) to about 85% (w/v). The concentration of the aqueous fluid in the cement composition can range from any lower limit to any upper limit and encompass any subset between the upper and lower limits. Some of the lower limits listed can be greater than some of the listed upper limits. One skilled in the art will recognize that the selected subset can require the selection of an upper limit in excess of the selected lower limit. Therefore, it is to be understood that every range of values is encompassed within the broader range of values. For example, the concentration of the aqueous fluid in the cement composition can range from about 0.5% (w/v) to about 85% (w/v), from about 1% (w/v) to about 85% (w/v), from about 5% (w/v) to about 85% (w/v), from about 10% (w/v) to about 85% (w/v), from about 15% (w/v) to about 85% (w/v), from about 20% (w/v) to about 85% (w/v), from about 25% (w/v) to about 85% (w/v), from about 30% (w/v) to about 85% (w/v), from about 35% (w/v) to about 85% (w/v), from about 40% (w/v) to about 85% (w/v), from about 45% (w/v) to about 85% (w/v), from about 50% (w/v) to about 85% (w/v), from about 55% (w/v) to about 85% (w/v), from about 60% (w/v) to about 85% (w/v), from about 65% (w/v) to about 85% (w/v), from about 70% (w/v) to about 85% (w/v), from about 75% (w/v) to about 85% (w/v), or from about 80% (w/v) to about 85% (w/v). As another example, the concentration of the aqueous fluid in the cement composition can range from about 0.5% (w/v) to about 85% (w/v), from about 0.5% (w/v) to about 80% (w/v), from about 0.5% (w/v) to about 75% (w/v), from about 0.5% (w/v) to about 70% (w/v), from about 0.5% (w/v) to about 65% (w/v), from about 0.5% (w/v) to about 60% (w/v), from about 0.5% (w/v) to about 55% (w/v), from about 0.5% (w/v) to about 50% (w/v), from about 0.5% (w/v) to about 45% (w/v), from about 0.5% (w/v) to about 40% (w/v), from about 0.5% (w/v) to about 35% (w/v), from about 0.5% (w/v) to about 30% (w/v), from about 0.5% (w/v) to about 25% (w/v), from about 0.5% (w/v) to about 20% (w/v), from about 0.5% (w/v) to about 15% (w/v), from about 0.5% (w/v) to about 10% (w/v), from about 0.5% (w/v) to about 5% (w/v), or from about 0.5% (w/v) to about 1% (w/v). With the benefit of this disclosure, one of ordinary skill in the art will be able to prepare a cement composition having a sufficient concentration of aqueous fluid for a given application.

Some examples of the cement composition can comprise a calcium ion source. Suitable calcium ion sources can comprise any compound such as a calcium-containing salt or other species that is capable of dissociation to give calcium ions. In some examples, the calcium ion source can be capable of reacting with any other constituent of the cement composition as to form a cementitious material. For example, suitable calcium ion sources can be capable of reacting with pumice in the presence of water so as to form a cementitious material. Examples of calcium ion sources include, but are not limited to, hydrated lime (which can alternatively be referred to as calcium hydroxide, slaked lime, builder's lime, and/or slack lime); quick lime (which can alternatively be referred to as, e.g., calcium oxide); and calcium salts in the presence of a hydroxide ion source. Calcium salts according to some examples can be of the form $CaX_2$, where X is an anion with a formal charge of −1 (e.g., $CaBr_2$, $CaF_2$, $CaI_2$, $CaCl_2$). Calcium salts according to other embodiments may be of the form CaX, where X is an anion with a formal charge of −2 (e.g., carbonate anion $CO_3^{-2}$). In some examples, a calcium ion source can be accompanied by or otherwise combined with a hydroxide ion source in the cement composition. Such a source can include a hydroxide salt of an alkali or alkaline earth element. Suitable hydroxide salts include sodium hydroxide, potassium hydroxide, and calcium hydroxide. In certain examples, the calcium ion source can be included in a cement composition and subjected to alkaline conditions (for example, in order to support a pozzolanic reaction between the calcium ion source and the pozzolan of some example cement compositions). In some examples, the calcium ion source itself can be alkaline or can, upon disassociation, create alkaline conditions (e.g., such as would occur upon the dissociation of calcium hydroxide).

Where present, the calcium ion source can be included in the cement composition in an amount in the range of from about 10% to about 100% by weight of the cement. In some examples, the calcium ion source can be present in an amount ranging between any of and/or including any of about 10%, about 20%, about 40%, about 60%, about 80%, or about 100% by weight of the cement. One of ordinary skill in the art, with the benefit of this disclosure, will recognize the appropriate amount of the calcium ion source to include for a chosen application.

Some optional examples of the cement compositions can comprise a secondary cement retarder, for example, to assist the above discussed residue derived from a waste stream in delaying the setting and/or retarding the cement composition. In embodiments, no secondary or additional cement retarder is included in the cement composition (e.g., the cement retarder consists of the biosurfactant(s)). A broad variety of secondary cement retarders can be suitable for use in the cement composition. Reference to an additional cement retarder in addition to the biosurfactant described herein as a "secondary" cement retarder does not indicate the presence of more or less of the secondary cement retarder relative to the biosurfactant cement retarder. By way of non-limiting examples, the secondary cement retarder can comprise phosphonic acids, such as amino tris(methylene phosphonic acid), ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose ("HEC") and carboxymethyl hydroxyethyl cellulose ("CMHEC"); synthetic co- or terpolymers comprising sulfonate and carboxylic acid groups such as sulfonate-functionalized acrylamide-acrylic acid copolymers; borate compounds such as alkali borates, sodium metaborate, sodium tetraborate, potassium pentaborate; derivatives thereof, or mixtures thereof. Examples of suitable secondary cement retarders include, among others, phosphonic acid derivatives. Generally, the secondary cement retarder can be present in the cement composition in an amount sufficient to delay the setting of the cement composition for a desired time. In some examples, the secondary cement retarder can be present in the cement composition in an amount in the range of from about 0.01% to about 10% by weight of the cement. In specific embodiments, the secondary cement retarder can be present in an amount ranging between any of and/or including any of about 0.01%, about 0.1%, about 1%, about 2%, about 4%, about 6%, about 8%, or about 10% by weight of the cement. One of ordinary skill in the art, with the benefit of this disclosure, will recognize the appropriate amount of the secondary cement retarder to include for a chosen application.

Some optional examples of the cement composition can comprise a dispersant. Examples of suitable dispersants include, without limitation, sulfonated-formaldehyde-based dispersants (e.g., sulfonated acetone formaldehyde condensate). Other suitable dispersants can be polycarboxylated ether dispersants.

In some examples, the dispersant can be included in the cement composition in an amount in the range of from about 0.01% to about 5% by weight of the cement. In specific examples, the dispersant can be present in an amount ranging between any of and/or including any of about 0.01%, about 0.1%, about 0.5%, about 1%, about 2%, about 3%, about 4%, or about 5% by weight of the cement. One of ordinary skill in the art, with the benefit of this disclosure, will recognize the appropriate amount of the dispersant to include for a chosen application.

In some optional examples, a viscosifier can be included in the cement composition. The viscosifier can be included to optimize fluid rheology and to stabilize the suspension. Without limitation, examples of viscosifiers include swellable clays such as bentonite or biopolymers such as cellulose derivatives (e.g., hydroxyethyl cellulose, carboxymethyl cellulose, carboxymethyl hydroxyethyl cellulose). The viscosifier can be included in the cement composition in an amount in the range of from about 0.01% to about 0.5% by weight of the cement. In specific examples, the viscosifier can be present in an amount ranging between any of and/or including any of about 0.01%, about 0.05%, about 0.1%, about 0.2%, about 0.3%, about 0.4%, or about 0.5% by weight of the cement. One of ordinary skill in the art, with the benefit of this disclosure, will recognize the appropriate amount of viscosifier to include for a chosen application.

Other optional additives suitable for use in the cementing composition can also be provided as desired for a particular application. Examples of such additives include, but are not limited to, foaming additives, strength-retrogression additives, lightweight additives, gas-generating additives, mechanical-property-enhancing additives, lost-circulation materials, fluid-loss-control additives, defoaming additives, thixotropic additives, and any combination thereof. Specific examples of these, and other, additives include crystalline silica, fumed silica, silicates, salts, fibers, hydratable clays, microspheres, diatomaceous earth, natural pozzolan, zeolite, fly ash, rice hull ash, swellable elastomers, resins, any combination thereof, and the like. A person having ordinary skill in the art, with the benefit of this disclosure, will readily be able to determine the type and amount of additive useful for a particular application and desired result.

Optionally, foaming additives can be included in the cement composition to, for example, facilitate foaming and/or stabilize the resultant foam formed therewith. In particular, the cement composition can be foamed with a foaming additive and a gas. The foaming additive can include a surfactant or combination of surfactants that reduce the surface tension of the water. By way of example, the foaming agent can comprise an anionic, nonionic, amphoteric (including zwitterionic surfactants), cationic surfactant, or mixtures thereof. Examples of suitable foaming additives include, but are not limited to, betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alphaolefin sulfonates; quaternary surfactants such as trimethyltallowammonium chloride and trimethylcocoammonium chloride; CS to C22 alkylethoxylate sulfates; and combinations thereof. Specific examples of suitable foaming additives include, but are not limited to, mixtures of an ammonium salt of an alkyl ether sulfate, a cocoamidopropyl betaine surfactant, a cocoamidopropyl dimethylamine oxide surfactant, sodium chloride, and water, mixtures of an ammonium salt of an alkyl ether sulfate surfactant, a cocoamidopropyl hydroxysultaine surfactant, a cocoamidopropyl dimethylamine oxide surfactant, sodium chloride, and water, hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof.

Optionally, strength-retrogression additives can be included in the cement composition to, for example, prevent the retrogression of strength after the cement composition has been allowed to develop compressive strength when the cement composition is exposed to high temperatures. These additives can allow the cement compositions to form as intended, preventing cracks and premature failure of the cementitious composition. Examples of suitable strength retrogression additives can include, but are not limited to, amorphous silica, coarse grain crystalline silica, fine grain crystalline silica, or a combination thereof.

Optionally, lightweight additives can be included in the cement composition to, for example, decrease the density of the cement composition. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Optionally, gas-generating additives can be included in the cement composition to release gas at a predetermined time, which can be beneficial to prevent gas migration from the formation through the cement composition before it hardens. The generated gas can combine with formation gas. Examples of suitable gas-generating additives include, but are not limited to, metal particles (e.g., aluminum powder) that react with an alkaline solution to generate a gas.

Optionally, mechanical-property-enhancing additives can be included in the cement composition to, for example, ensure adequate compressive strength and long term structural integrity. These properties can be affected by the strains, stresses, temperature, pressure, and impact effects from a subterranean environment. Examples of mechanical-property-enhancing additives include, but are not limited to, carbon fibers, glass fibers, metal fibers, mineral fibers, silica fibers, polymeric elastomers, latexes, graphene, and combinations thereof.

Optionally, lost-circulation materials can be included in the cement composition to, for example, help prevent the loss of fluid circulation into the subterranean formation. Examples of lost-circulation materials include, but are not limited to, cedar bark, shredded cane stalks, mineral fiber, mica flakes, cellophane, calcium carbonate, ground rubber, polymeric materials, pieces of plastic, ground marble, wood, nut hulls, formica, corncobs, cotton hulls, and combinations thereof.

Optionally, fluid-loss-control additives can be included in the cement composition to, for example, decrease the volume of fluid that is lost to the subterranean formation. Properties of the cement compositions can be significantly influenced by their water content. The loss of fluid can subject the cement composition to degradation or complete failure of design properties. Examples of suitable fluid-loss-control additives include, but are not limited to, certain polymers, such as hydroxyethyl cellulose, carboxymethylhydroxyethyl cellulose, copolymers of 2-acrylamido-2-methylpropanesul tonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Optionally, defoaming additives can be included in the cement composition to, for example, reduce tendency for the cement composition to foam during mixing and pumping of the cement compositions. Examples of suitable defoaming additives include, but are not limited to, polyol silicone compounds.

Optionally, thixotropic additives can be included in the cement composition to, for example, provide a cement composition that can be pumpable as a thin or low viscosity fluid, but when allowed to remain quiescent attains a relatively high viscosity. Among other things, thixotropic additives can be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

The components of the cement composition can be combined in any order desired to form a cement composition that can be placed on a surface and/or into a subterranean formation. In addition, the components of the cement composition can be combined using any mixing device compatible with the composition, including a bulk mixer for example. In some embodiments, a cement composition can be prepared by combining the dry components (which can be the cement component, for example) with water. Liquid additives (if any) can be combined with the water before the water is combined with the dry components. The dry components can be dry blended prior to their combination with the water. For example, a dry blend can be prepared that comprises the cement retarder and the dry cement component. Other suitable techniques can be used for preparation of the cement composition will be appreciated by those of ordinary skill in the art in accordance with the disclosed examples.

The cement composition generally has a density suitable for a particular application. By way of example, the cement compositions can have a density in the range of from about 4 pounds per gallon ("lb/gal") to about 20 lb/gal. In certain examples, the cement composition can have a density in the range of from about 8 lb/gal to about 17 lb/gal. Examples of the cement composition can be foamed or unfoamed or can comprise other means to reduce their densities, such as hollow microspheres, low-density elastic beads, or other density-reducing additives known in the art. In some examples, the density can be reduced after storing the composition, but prior to placement in a subterranean formation. Those of ordinary skill in the art, with the benefit of this disclosure, will recognize the appropriate density for a particular application.

In some examples, the cement composition can set to have a desirable compressive strength after the period of delay induced by the cement retarder has ended. Compressive strength is generally the capacity of a material or structure to withstand axially directed pushing forces. The compressive strength can be measured when the cement composition is maintained under specified temperature and pressure conditions. Compressive strength can be measured by either destructive or non-destructive methods. The destructive method physically tests the strength of cement composition samples at various points in time by crushing the samples in a compression-testing machine. The compressive strength can be calculated from the failure load divided by the cross-sectional area resisting the load and is reported in units of pound-force per square inch (psi). Non-destructive methods can employ an ultrasonic cement analyzer (UCA). Compressive strength values can be determined in accordance with API RP Practice 10B-2, Recommended Practice for Testing Well Cements, Second Edition, R2019.

By way of example, the cement composition can develop a 24-hour compressive strength in the range of from about 50 psi to about 5000 psi, alternatively, from about 100 psi to about 4500 psi, or alternatively from about 500 psi to about 4000 psi. In some examples, the cement composition can develop a compressive strength in 24 hours of at least about 50 psi, at least about 100 psi, at least about 500 psi, or more. In some examples, the compressive strength values can be determined using destructive or non-destructive methods at a temperature ranging from about 40° F. (or lower) to about 500° F. (or higher).

In some examples, the cement composition can have a desired thickening time after addition of the cement retarder. Thickening time typically refers to the time a fluid, such as a cement composition, remains in a fluid state capable of being pumped. A pressurized consistometer, operated in accordance with the procedure set forth in the aforementioned API RP Practice 10B-2, can be used to measure whether a fluid is in a pumpable fluid state. The thickening time can be the time for the treatment fluid to reach 70 Beardon Units of Consistency (Bc) and can be reported as the time to reach 70 Bc. In some embodiments, the cement composition can have a thickening time of greater than about 1 hour, alternatively, greater than about 2 hours, alternatively greater than about 5 hours (e.g., at pressures from about 1000 to about 5000 psi, from about 2000 to about 4000 psi, or about 3,000 psi and temperatures in a range of from about 50° F. to about 500° F., from about 50° F. to about 400° F., alternatively, in a range of from about 80° F. to about 250° F., and alternatively at a temperature of about 140° F.).

In embodiments, a thickening time of the cement composition of this disclosure, as measured by API RP Practice 10B-2, is increased by at least 0.5 hour, 5 hours, or 48 hours and/or at least 10, 15, 20, or 25% (e.g., at a temperature of greater than equal to about 250° F. (121.1° C.), 300° F. (148.9° C.), 325° F. (162.8° C.), 350° F. (176.7° C.), 375° F. (190.6° C.), 400° F. (204.4° C.), 425° F. (218.3° C.), 450° F. (232.2° C.), or 500° F. (260° C.)) relative to a same cement composition absent the cement retarder.

It has been unexpectedly discovered that, with the increase in the thickening time, the cement retarder of this disclosure does not concomitantly delay an onset of compressive strength (e.g., time to attain a compressive strength of 50, 500, or 1000 psi as measured via Ultrasonic Cement Analyzer (UCA) according to API Recommended Practice 10B-2/ISO 10426-2 section 7) relative to a same cement composition absent the cement retarder. In embodiments, the cement retarder of this disclosure does not delay the onset of compressive strength (e.g., attainment of a compressive strength of 50, 500, or 1000 psi as measured via Ultrasonic Cement Analyzer (UCA) according to API Recommended Practice 10B-2/ISO 10426-2 section 7) or does not delay the onset of the compressive strength as much as another cement composition that is absent the biosurfactant and comprises a different/conventional cement retarder and has a same or similar thickening time (e.g., a thickening time within 5, 10, or 15% of the thickening time of the cement composition of this disclosure). Such different/conventional cement retarders can comprise one of the "secondary cement retarders" described hereinabove.

The cement composition of this disclosure can comprise an amount of the cement retarder comprising the biosurfactant (e.g., sophorolipid), and a conventional cement composition having the same or similar thickening time (e.g., the another cement composition or the same cement composition noted above absent the biosurfactant cement retarder of this disclosure) can comprise an amount of the different cement retarder, and, surprisingly, for the same or similar thickening time, the amount of the cement retarder comprising the biosurfactant can be (e.g., 10, 20, 30, 40, 50, 60, 70, 75, 80, 90, or greater percent) less than the amount of the different cement retarder. For example, in embodiments, the amount of the cement retarder comprising the biosurfactant in the cement composition of this disclosure can be less 75%, 50%, or 25% of the amount of the different cement retarder in another/conventional cement composition having the same or similar thickening time as the cement composition. The different/conventional cement retarder can be selected from phosphonic acids (e.g., amino tris(methylene phosphonic acid), ethylenediamine tetra(methylene phosphonic acid), diethylenetriamine penta(methylene phosphonic acid)); lignosulfonates (e.g., sodium lignosulfonate, calcium lignosulfonate); salts (e.g., stannous sulfate, lead acetate, monobasic calcium phosphate), organic acids (e.g., citric acid, tartaric acid); cellulose derivatives (e.g., hydroxyl ethyl cellulose ("HEC"), carboxymethyl hydroxyethyl cellulose ("CMHEC")); synthetic co- or terpolymers comprising sulfonate and carboxylic acid groups (e.g., sulfonate-functionalized acrylamide-acrylic acid copolymers); borate compounds (e.g., alkali borates, sodium metaborate, sodium tetraborate, potassium pentaborate); derivatives thereof, or combinations thereof.

As discussed further in Example 5 hereinbelow, the cement composition of this disclosure can exhibit a more predictable behavior to temperature than conventional cement compositions comprising conventional retarders (e.g., such as the secondary retarders noted herein, for example, lignosulfonate). That is, for a certain percentage of the retarder added (e.g., 0.1%), the herein disclosed cement compositions show a consistent reduction in thickening time with temperature, even as the slurry temperature crosses from 190° F. to above 200° F., which typically causes erratic behavior for conventional cement compositions. A plot of extension of thickening time with temperature for a cement composition of this disclosure having a given amount (e.g., 0.1%) of the biosurfactant retarder can thus have an increased slope relative to such a plot for a same cement composition comprising a conventional (e.g., lignosulfonate) retarder, which can be referred to as an increased potency of (e.g., the retarding capability of the) biosurfactant retarder to for equal loading. The biosurfactant concentration can be lowered to about one quarter relative to that of the conventional retarder to obtain a similar slope under 250° F. Above 250° F., the conventional retarder can be ineffective at increasing the thickening time even after doubling the concentration, while the biosurfactant retarder of this disclosure can continue to function even up to 400° F., in applications.

In some optional examples a cement accelerator can be added to the cement composition either before, during, or after the cement composition is introduced downhole. In addition to, or alternatively, a cement set activator can be added to the cement composition before, during, or after the cement composition is introduced downhole. The term "cement set activator" or "activator," as used herein, refers to an additive that activates a retarded cement composition and can also in certain systems accelerate the setting of a retarded cement composition. By way of example, the retarded cement composition can be activated to form a hardened mass in a time period in the range of from about 1 hour to about 12 hours. For example, a retarded cement composition can set to form a hardened mass in a time period ranging between any of and/or including any of about 1 hour, about 2 hours, about 4 hours, about 6 hours, about 8 hours, about 10 hours, or about 12 hours.

Examples of suitable cement set activators include, but are not limited to, zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some examples, a combination of the polyphosphate and a monovalent salt can be used for activation. The monovalent salt can be any salt that dissociates to form a monovalent cation, such as sodium and potassium salts. Specific examples of suitable monovalent salts include potassium sulfate, and sodium sulfate. A variety of different polyphosphates can be used in combination with the monovalent salt for activation of the cement composition, including polymeric metaphosphate salts, phosphate salts, and combinations thereof.

Specific examples of polymeric metaphosphate salts that can be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In a specific example, the activator can be provided and added to the cement composition as a liquid additive, for example, a liquid additive comprising a monovalent salt, a polyphosphate, and optionally a dispersant.

Some optional examples can include a cement set activator comprising a combination of a monovalent salt and a polyphosphate. The monovalent salt and the polyphosphate can be combined prior to addition to the cement composition or can be separately added to the cement composition. The monovalent salt can be any salt that dissociates to form a monovalent cation, such as sodium and potassium salts. Specific examples of suitable monovalent salts include potassium sulfate and sodium sulfate. A variety of different polyphosphates can be used in combination with the monovalent salt for activation of the set-delayed cement compositions, including polymeric metaphosphate salts, phosphate salts, and combinations thereof, for example. Specific examples of polymeric metaphosphate salts that can be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. Interestingly, sodium hexametaphosphate is also known in the art to be a strong retarder of Portland cements. Because of the unique chemistry of polyphosphates, polyphosphates can be used as a cement set activator for embodiments of the cement compositions disclosed herein. The ratio of the monovalent salt to the polyphosphate can range, for example, from about 5:1 to about 1:25 or from about 1:1 to about 1:10. Embodiments of the cement set activator can comprise the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some examples, the combination of the monovalent salt and the polyphosphate can be mixed with a dispersant and water to form a liquid additive for activation of a retarded cement composition. Examples of suitable dispersants include, without limitation, the previously described dispersants, such as sulfonated-formaldehyde based dispersants and polycarboxylated ether dispersants. The liquid additive can function as a cement set activator. As discussed above, a cement set activator can also accelerate the setting of the retarded cement composition. The use of a liquid additive to accelerate a retarded cement composition is dependent upon the compositional makeup of the liquid additive as well as the compositional makeup of the retarded cement composition. With the benefit of this disclosure, one of ordinary skill in the art should be able to formulate a liquid additive to activate and/or accelerate a retarded cement composition.

In some optional examples, the cement set activator can be added to the retarded cement composition in an amount sufficient to induce the retarded cement composition to set into a hardened mass. In certain examples, the cement set activator can be added to the retarded cement composition in an amount in the range of about 0.1% to about 20% by weight of the cement. In specific examples, the cement set activator can be present in an amount ranging between any of and/or including any of about 0.1%, about 1%, about 5%, about 10%, about 15%, or about 20% by weight of the cement. One of ordinary skill in the art, with the benefit of this disclosure, will recognize the appropriate amount of cement set activator to include for a chosen application.

Examples of the cement compositions can be used in a variety of cementing operations such as surface cementing operations (e.g., construction) and subterranean cementing operations (e.g., primary and remedial cementing). As an example, a cement composition can be provided that comprises water, cement, and a cement retarder comprising glycolipid (e.g., sophorolipid). The cement composition can be introduced into a subterranean formation and allowed to set therein. As used herein, introducing the cement composition into a subterranean formation includes introduction into any portion of the subterranean formation, including, without limitation, into a wellbore drilled into the subterranean formation, into a near wellbore region surrounding the wellbore, or into both.

In some example primary cementing methods, the cement composition can be introduced into an annular space between a conduit located in a wellbore and the walls of a wellbore (and/or a larger conduit in the wellbore), wherein the wellbore penetrates the subterranean formation. The cement composition can be allowed to set in the annular space to form an annular sheath of hardened cement. The cement composition can form a barrier that prevents the migration of fluids in the wellbore. The cement composition can also support the conduit in the wellbore.

In some example remedial cementing methods, a cement composition can be used for squeeze-cementing operations or in the placement of cement plugs. By way of example, the cement composition can be placed in a wellbore to plug an opening (e.g., a void or crack) in the formation, in a gravel pack, in the conduit, in the cement sheath, and/or between the cement sheath and the conduit (e.g., a microannulus).

Referring now to FIG. 1, preparation of a retarded cement composition will now be described. FIG. 1 is an illustration of a system 2 for preparation of a retarded cement composition and delivery to a wellbore in accordance with certain examples. As shown, the cement composition can be mixed in mixing equipment 4, such as a jet mixer, re-circulating mixer, or a batch mixer, and then pumped via pumping equipment 6 to the wellbore. In some examples, the mixing equipment 4 and the pumping equipment 6 can be disposed on one or more cement trucks as will be apparent to those of ordinary skill in the art. In some examples, a jet mixer can be used to continuously mix the cement and the cement retarder with the water as it is being pumped to the wellbore. In some examples, a re-circulating mixer and/or a batch mixer can be used to mix the cement and the cement retarder can be added to the mixer as a liquid or a powder prior to pumping the retarded cement composition downhole.

Figure 2:
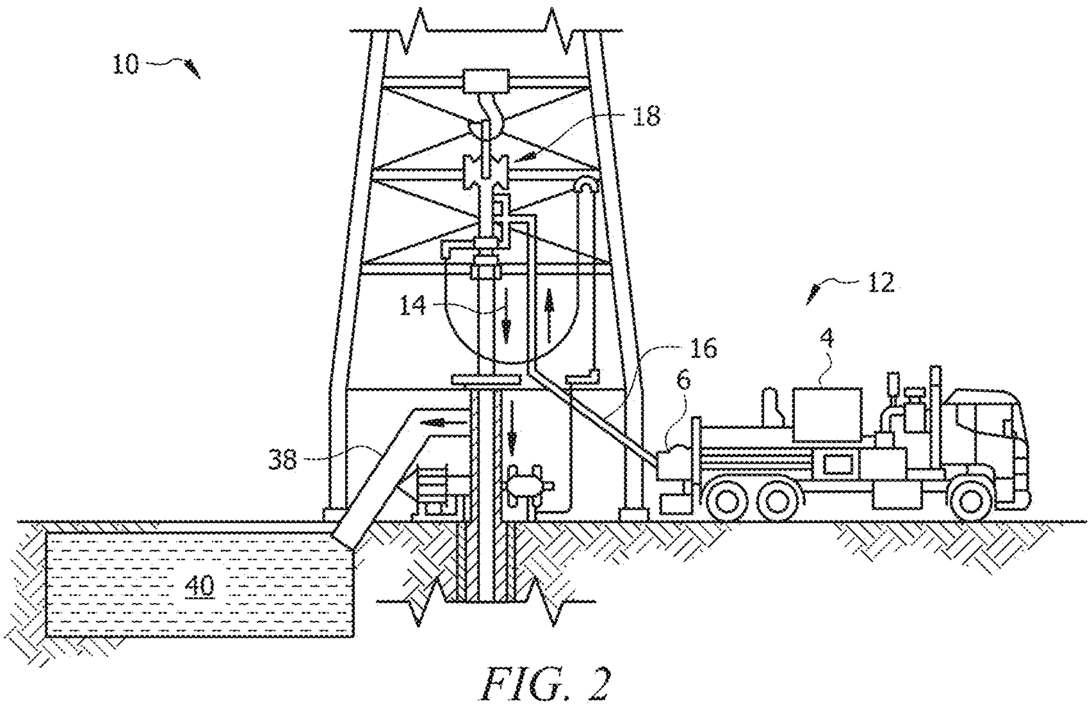
FIG. 2 is a schematic illustrating surface equipment for cementing with a retarded cement composition in accordance with one or more examples described herein.

An example technique for placing a cement composition into a subterranean formation will now be described with reference to FIGS. 2 and 3. FIG. 2 illustrates surface equipment 10 that can be used in placement of a cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 can include a cementing unit 12, which can include one or more cement trucks. The cementing unit 12 can include mixing equipment 4 and pumping equipment 6. The cementing unit 12 can pump a retarded cement composition 14 through a feed pipe 16 and to a cementing head 18 which conveys the retarded cement composition 14 downhole.

Figure 3:
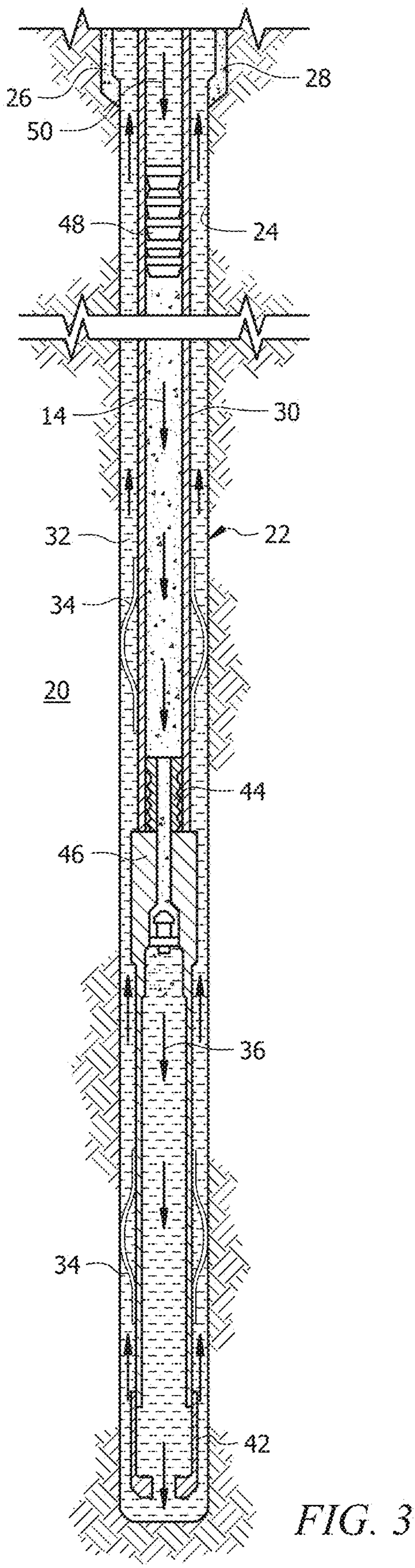
FIG. 3 is a schematic illustrating wellbore equipment for cementing with a retarded cement composition in accordance with one or more examples described herein.

Turning now to FIG. 3, the retarded cement composition 14 can be placed into a subterranean formation 20 in accordance with example embodiments. As illustrated, a wellbore 22 can be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the well bore 22 comprises walls 24. In the illustrated embodiment, a surface casing 26 has been inserted into the well bore 22. The surface casing 26 can be cemented to the walls 24 of the wellbore 22 by cement sheath 28. In the illustrated embodiment, one or more additional conduits (e.g., intermediate casing, production casing, liners, etc.), shown here as casing 30, can also be disposed in the wellbore 22. As illustrated, there is a wellbore annulus 32 formed between the casing 30 and the walls 24 of the wellbore 22 and/or the surface casing 26. One or more centralizers 34 can be attached to the casing 30, for example, to centralize the casing 30 in the wellbore 22 prior to and during the cementing operation.

With continued reference to FIG. 3, the retarded cement composition 14 can be pumped down the interior of the casing 30. The retarded cement composition 14 can be allowed to flow down the interior of the casing 30 through the casing shoe 42 at the bottom of the casing 30 and up around the casing 30 into the wellbore annulus 32. The retarded cement composition 14 can be allowed to set in the wellbore annulus 32, for example, to form a cement sheath that supports and positions the casing 30 in the wellbore 22. While not illustrated, other techniques can also be utilized for introduction of the retarded cement composition 14. By way of example, reverse circulation techniques can be used that include introducing the retarded cement composition 14 into the subterranean formation 20 by way of the wellbore annulus 32 instead of through the casing 30.

As it is introduced, the retarded cement composition 14 can displace other fluids 36, such as drilling fluids and/or spacer fluids that can be present in the interior of the casing 30 and/or the wellbore annulus 32. At least a portion of the displaced fluids 36 can exit the wellbore annulus 32 via a flow line 38 and be deposited, for example, in one or more retention pits 40 (e.g., a mud pit), as shown on FIG. 2. Referring again to FIG. 3, a bottom plug 44 can be introduced into the wellbore 22 ahead of the retarded cement composition 14 to separate the retarded cement composition 14 from the other fluids 36 that can be inside the casing 30 prior to cementing. After the bottom plug 44 reaches the landing collar 46, a diaphragm or other suitable device should rupture to allow the retarded cement composition 14 through the bottom plug 44. In FIG. 3, the bottom plug 44 is shown on the landing collar 46. In the illustrated embodiment, a top plug 48 can be introduced into the wellbore 22 behind the retarded cement composition 14. The top plug 48 can separate the retarded cement composition 14 from a displacement fluid 50 and also push the retarded cement composition 14 through the bottom plug 44.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

It is also to be recognized that the disclosed cement compositions can also directly or indirectly affect the various downhole equipment and tools that can contact the cement compositions disclosed herein. Such equipment and tools can include, but are not limited to, wellbore casing, wellbore liner, completion string, insert strings, drill string, coiled tubing, slickline, wireline, drill pipe, drill collars, mud motors, downhole motors and/or pumps, surface mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components can be included in the methods and systems generally described above and depicted in FIGS. 1-3.

Provided are methods of cementing in a subterranean formation in accordance with the disclosure and the illustrated FIGs. An example method comprises providing a cement composition comprising an aqueous fluid, a cement, and a cement retarder, wherein the cement retarder comprises a biosurfactant, such as a glycolipid (e.g., a sophorolipid). The method further comprises introducing the cement composition into a wellbore penetrating a subterranean formation; pumping the cement composition to a location within the wellbore; and allowing the cement composition to set in the location.

Additionally or alternatively, the method can include one or more of the following features individually or in combination. The cement retarder can be present in the cement composition in an amount of about 0.1% to about 15% by weight of the cement. The cement can be selected from the group consisting of Portland cements, pozzolanic cements, gypsum cements, high alumina content cements, silica cements, high alkalinity cements, slag cements, shale cements, cement kiln dust, and any combination thereof. The cement composition can further comprise an additive selected from the group consisting of foaming additives, strength-retrogression additives, lightweight additives, gas-generating additives, mechanical-property-enhancing additives, lost-circulation materials, fluid-loss-control additives, defoaming additives, thixotropic additives, and any combination thereof. The cement composition can have a density in the range of from about 4 pounds per gallon to about 20 pounds per gallon.

Provided are cement compositions for cementing in a subterranean formation in accordance with the disclosure and the illustrated FIGs. An example cement composition comprises an aqueous fluid, a cement, and a cement retarder, wherein the cement retarder comprises a biosurfactant, such as a glycolipid (e.g., a sophorolipid).

Additionally or alternatively, the cement composition can include one or more of the following features individually or in combination. The cement retarder can be present in the cement composition in an amount of about 0.1% to about 15% by weight of the cement. The cement can be selected from the group consisting of Portland cements, pozzolanic cements, gypsum cements, high alumina content cements, silica cements, high alkalinity cements, slag cements, shale cements, cement kiln dust, and any combination thereof. The cement composition can further comprise an additive selected from the group consisting of foaming additives, strength-retrogression additives, lightweight additives, gas-generating additives, mechanical-property-enhancing additives, lost-circulation materials, fluid-loss-control additives, defoaming additives, thixotropic additives, and any combination thereof. The cement composition can have a density in the range of from about 4 pounds per gallon to about 20 pounds per gallon.

Also provided are systems for cementing in a subterranean formation in accordance with the disclosure and the illustrated FIGs. An example system comprises a cement composition comprising: an aqueous fluid, a cement, and a cement retarder, wherein the cement retarder comprises a biosurfactant, such as a glycolipid (e.g., a sophorolipid). The system can further comprise mixing equipment configured to mix the aqueous fluid, the cement, and the cement retarder to provide the cement composition, and pumping equipment configured to pump the cement composition into a wellbore penetrating a subterranean formation.

Additionally or alternatively, the system can include one or more of the following features individually or in combination. The cement retarder can be present in the cement composition in an amount of about 0.1% to about 15% by weight of the cement. The cement can be selected from the group consisting of Portland cements, pozzolanic cements, gypsum cements, high alumina content cements, silica cements, high alkalinity cements, slag cements, shale cements, cement kiln dust, and any combination thereof. The cement composition can further comprise an additive selected from the group consisting of foaming additives, strength-retrogression additives, lightweight additives, gas-generating additives, mechanical-property-enhancing additives, lost-circulation materials, fluid-loss-control additives, defoaming additives, thixotropic additives, and any combination thereof. The cement composition can have a density in the range of from about 4 pounds per gallon to about 20 pounds per gallon.

The preceding description provides various examples of the systems and methods of use disclosed herein which can contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or" consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure can be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

This disclosure describes the use of a biosurfactant, such as a glycolipid (e.g., sophorolipid) as a cement retarder, and the use of biosurfactant, such as a glycolipid (e.g., sophorolipid) as a cement retarder booster. Herein disclosed is a cost effective retarder operable from 60° F. to 400° F. that doesn't negatively affect compressive strength development. The biosurfactant cement retarder of this disclosure can be used over a wide temperature range (e.g., even at high temperature, such as temperatures greater than or equal to about 250° F. (121.1° C.), 300° F. (148.9° C.), 325° F. (162.8° C.), 350° F. (176.7° C.), 375° F. (190.6° C.), 400° F. (204.4° C.), 425° F. (218.3° C.), 450° F. (232.2° C.), or 500° F. (260° C.)) without hurting or even improving early compressive strength.

The retarder of this disclosure can be produced by fermentation, which can be scaleable and cost effective. The herein disclosed retarder can compete with single sourced lignosulfonate retarders or act as a booster to enhance the effective range of such lignosulfonate retarders without hurting and, in some embodiments, improving compressive strength development.

To facilitate a better understanding of the present embodiments, the following examples of certain aspects of some embodiments are given. In no way should the following examples be read to limit, or define, the entire scope of the embodiments.

EXAMPLES

The present disclosure may be better understood by reference to the following examples, which are offered by way of illustration. The present disclosure is not limited to the examples provided herein.

Example 1A: UCA Compressive Strength Difference 140° F. (60° C.). A Comparative Cement 1 and Biosurfactant Cement 1 comprising the components provided in Table 1 were formed and studied to determine the thickening time, a time from the thickening time to a compressive strength of 50 psi UCA, a time from the thickening time to a compressive strength of 500 psi UCA, and a time from the thickening time to a compressive strength of 1000 psi UCA. Comparative Cement 1 and Biosurfactant Cement 1 each comprised LaFarge Class H cement, salt (potassium chloride; KCl), a fluid loss control additive; and a suspension aid. Comparative Cement 1 comprised a conventional retarder of chemically modified lignosulfonate, while Biosurfactant Cement 1 comprised biosurfactant retarder according to this disclosure. The amount of biosurfactant (0.01%) was one fourth the amount of the conventional retarder (0.04%), to achieve a similar thickening time (3 hours and 23 minutes for Comparative Cement 1 and 3 hours and 40 minutes for Biosurfactant Cement 1).

The thickening time was measured using a pressurized consistometer set at a 159° F. bottom hole circulating temperature, and the end point was the time taken to reach 70 Bc. The measurement was performed in accordance with the procedure for determining cement thickening times set forth in API Schedule 16. The times to 50, 500, and 1000 psi UCA were determined by API RP 10B-2.

TABLE 1

| Material | Units | Comparative Cement 1 | BioSurfactant Cement 1 |
|---|---|---|---|
| | | Concentration | |
| Class H Cement | BWOC | 100% | 100% |
| KCl | pounds/sack (lbs/sk) | 1.86 | 1.86 |
| Fluid Loss Additive | gps | 0.12 | 0.12 |
| Suspension Additive | gps | 0.02 | 0.02 |
| Retarder | gps | 0.04 | — |
| BioSurfactant | gps | — | 0.01 |
| Thickening Time | hh:mm | 3:23 | 3:40 |
| Difference in Thickening Time to 50 psi UCA | min | 202 | 7 |
| Difference in Thickening Time to 500 psi UCA | min | 233 | 49 |
| Difference in Thickening Time to 1000 psi UCA | min | 274 | 96 |

Figure 4:
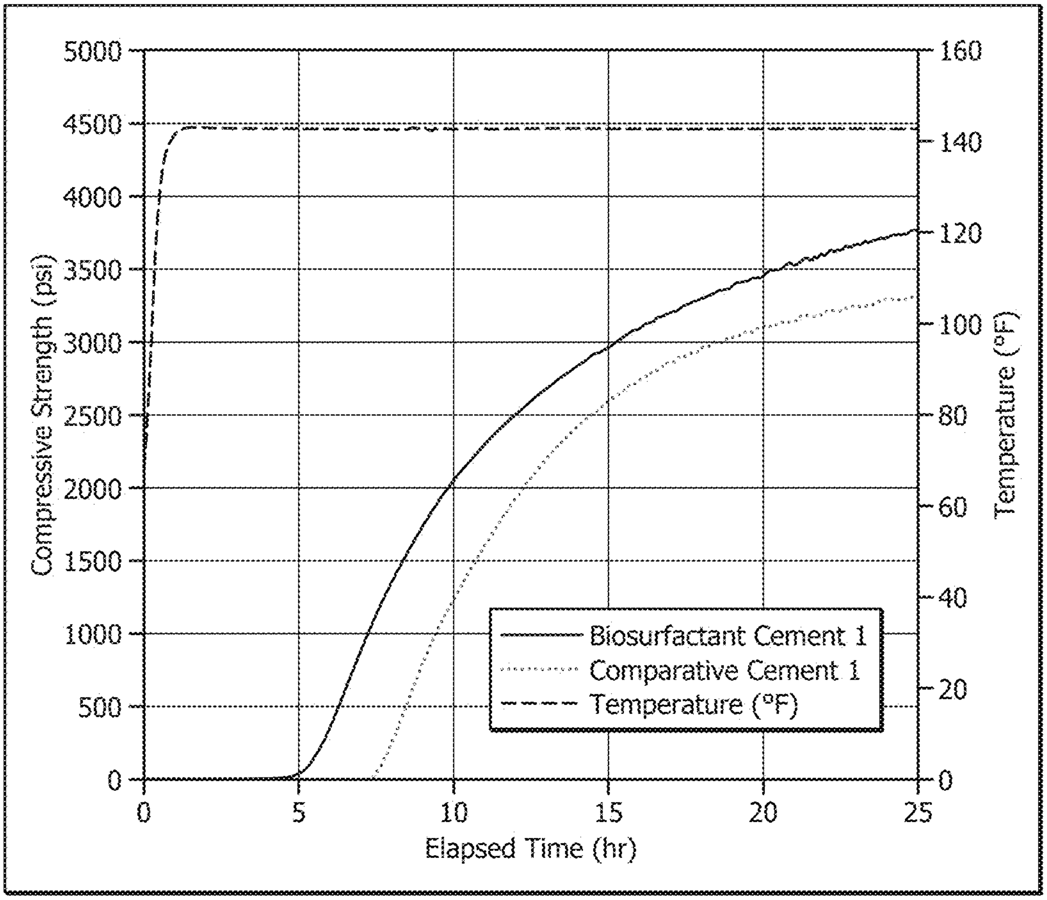
FIG. 4 is a plot of compressive strength (psi) and temperature (° F.) as a function of elapsed time (hours) for Comparative Cement 1 and Biosurfactant Cement 1 of Example 1A.

Unexpectedly, the biosurfactant retarder substantially reduced an amount of time from thickening to 50, 500, and 1000 psi UCA. The difference from thickening time to 50, 500, and 1000 psi UCA respectively, went from 202 minutes for the Comparative Cement 1 comprising the conventional retarder to just 7 minutes for the Biosurfactant Cement 1 comprising the biosurfactant retarder according to this disclosure; from 233 minutes for the Comparative Cement 1 comprising the conventional retarder to just 49 minutes for the Biosurfactant Cement 1 comprising the biosurfactant retarder according to this disclosure; and from 274 minutes for the Comparative Cement 1 comprising the conventional retarder to just 96 minutes for the Biosurfactant Cement 1 comprising the biosurfactant retarder according to this disclosure. FIG. 4 is a plot of compressive strength (psi) and temperature (° F.) as a function of elapsed time (hours) for Comparative Cement 1 and Biosurfactant Cement 1 of this Example 1A.

Example 1B: UCA Compressive Strength Difference 330° F. (165.6° C.). The experiments of Example 1A were repeated at 330° F. As shown in Table 2, in this Experiment 1B, Comparative Cement 2 each comprised Class H cement, a silica flour, fluid loss control additives; and a suspension aid. Comparative Cement 2 further comprised a conventional retarder comprising a synthetic retarder, and tartaric acid, while Biosurfactant Cement 2 comprised biosurfactant retarder according to this disclosure and a dispersant. The amount of biosurfactant was 0.05%.

The thickening time and the time to 50, 500, and 1000 psi UCA were determined by API RP 10B-2.

TABLE 2

| Material | Units | Comparative Cement 2 | Biosurfactant Cement 2 |
|---|---|---|---|
| | | Concentration (%) | |
| Class H Cement | BWOC | 100 | 100 |
| Silica Flour | BWOC | 35 | 35 |
| Fluid Loss Additive | BWOC | 0.20 | 0.20 |
| Fluid Loss Additive | BWOC | 0.30 | 0.30 |
| Suspension Additive | BWOC | 0.20 | 0.20 |
| Retarder | BWOC | 0.70 | — |
| Retarder | BWOC | 0.70 | — |
| Dispersant | BWOC | — | 0.40 |
| Biosurfactant | gps | — | 0.05 |
| Thickening Time | hh:mm | 9:46 | 6:45 |
| Difference in Thickening Time to 50 psi UCA | min | 512 | −45 |
| Difference in Thickening Time to 500 psi UCA | min | 685 | 8 |
| Difference in Thickening Time to 1000 psi UCA | min | 863 | 67 |

Figure 5:
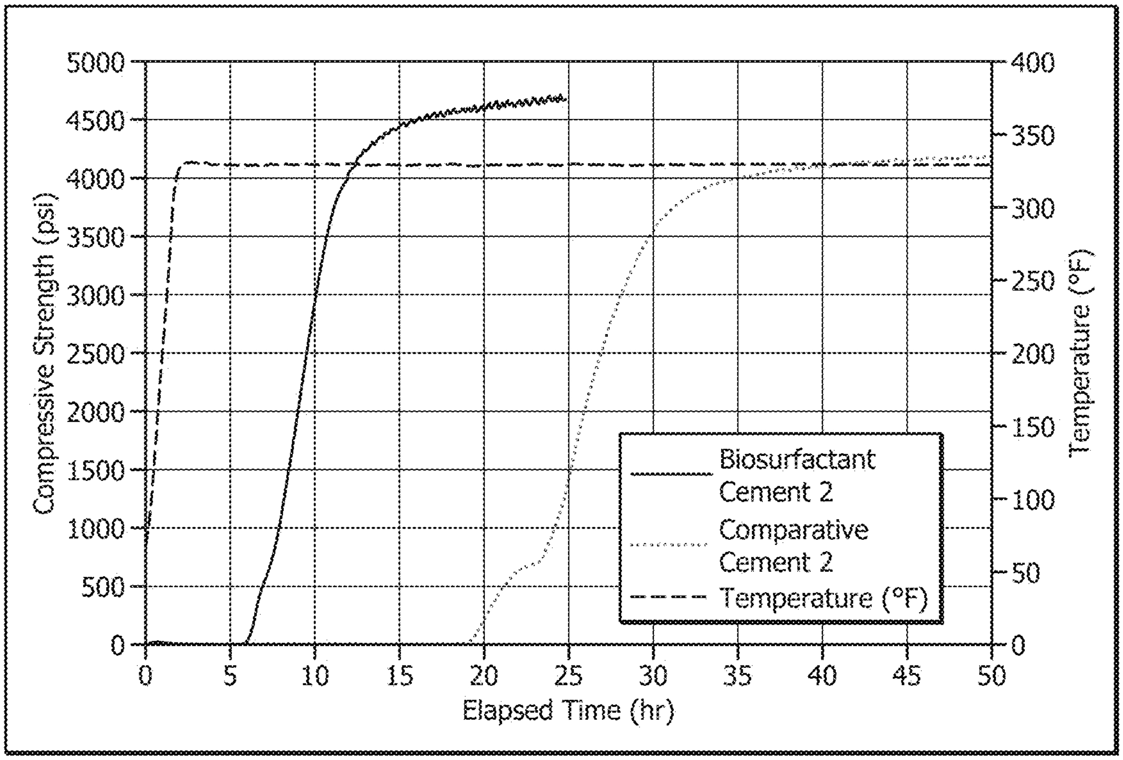
FIG. 5 is a plot of compressive strength (UCA; psi) and temperature (° F.) as a function of elapsed time (hours) for Comparative Cement 2 and Biosurfactant Cement 2 of Example 1B.

The thickening time for Comparative Cement 2 was 9 hours and 46 minutes, while the thickening time for Biosurfactant Cement 2 was 6 hours and 45 minutes. Again, unexpectedly, the biosurfactant retarder substantially reduced an amount of time from thickening to 50, 500, and 1000 psi UCA. The difference from thickening time to 50, 500, and 1000 psi UCA respectively, went from 512 minutes for the Comparative Cement 2 comprising the conventional retarder to just-45 minutes for the Biosurfactant Cement 2 comprising the biosurfactant retarder according to this disclosure (indicating that in the static UCA test the cement began showing strength about 45 minutes earlier than the dynamic thickening time test showed 70Bc, due to the static versus dynamic as well as circulating versus static temperatures utilized in the respective measurements); from 685 minutes for the Comparative Cement 2 comprising the conventional retarder to just 8 minutes for the Biosurfactant Cement 2 comprising the biosurfactant retarder according to this disclosure; and from 863 minutes for the Comparative Cement 2 comprising the conventional retarder to just 67 minutes for the Biosurfactant Cement 2 comprising the biosurfactant retarder according to this disclosure. FIG. 5 is a plot of compressive strength (UCA; psi) and temperature (° F.) as a function of elapsed time (hours) for Comparative Cement 2 and Biosurfactant Cement 2 of this Example 1B.

Example 2. Study of Various Retarders at 94° F. (34.4° C.), 190° F. (87.8° C.), 250° F. (121.1° C.), 300° F. (148.9° C.), and 400° F. (204.4° C.).

In this Example 2, the thickening times of cement compositions comprising various concentrations of conventional retarders and biosurfactants of this disclosure (Biosurfactant 1, Biosurfactant 2) were determined at five temperatures, as shown in Tables 3-7 (94° F. (34.4° C.) Table 3, 190° F. (87.8° C.) Table 4, 250° F. (121.1° C.) Table 5, 300° F. (148.9° C.) Table 6, and 400° F. (204.4° C.) Table 7). Biosurfactant 1 comprised lactonic sophorolipid, Biosurfactant 2 comprised linear (e.g., acidic form) sophorolipid, As seen in Table 3, which shows the thickening times in minutes, at 94° F. (34.4° C.), Biosurfactant 1 or Biosurfactant 2 provided similar thickening time (312 minutes or 220 minutes) to that (227 minutes) to that of Conventional Retarder, at one quarter (0.01 gallons per sack (gps)) the amount of the Conventional Retarder (0.04 gps). Thus, as the amount of retarder material is increased, the thickening time increases for the experimental concentrations tested for which the times are about equivalent to the conventional retarder.

TABLE 3

Thickening Times (min) for Example 2

| 94° F. (34.4° C.) Retarder Material | 0.04 gps(1x) | 0.02 gps(0.5x) | 0.01 gps(0.25x) |
|---|---|---|---|
| Conventional Lignosulfonate Retarder | 227 | | |
| Biosurfactant 1 | >1440 | 887 | 312 |
| Biosurfactant 2 | >1440 | 394 | 220 |

As seen in Table 4, at 190° F. (87.8° C.), Biosurfactant 1 or Biosurfactant 2 provided similar/shorter thickening time (158 minutes or 130 minutes) relative to that (221 or 175 minutes) of Conventional Lignosulfonate Retarder at one quarter (0.01 gallons per sack (gps)) the amount of the Conventional Lignosulfonate Retarder (0.04 gps), and shorter thickening time (158 minutes or 130 minutes) relative to that (180 minutes) of Conventional Alkylpolyglucoside 1 (APG2) retarder and Conventional Alkylpolyglucoside 2 (APG4) at one half (0.01 gallons per sack (gps)) the amount of the Conventional Alkylpolyglucoside Retarders (0.02 gps).

TABLE 4

Thickening Times (min) for Example 2

| 190° F. (87.8° C.) Material | 0.04 gps(1x) | 0.02 gps(0.5x) | 0.01 gps(0.25x) |
|---|---|---|---|
| Conventional Lignosulfonate Retarder | 180 | | |
| Biosurfactant 1 | 1328 | 441 | 158 |
| Biosurfactant 2 | 780 | 224 | 131 |
| Biosurfactant 2 + Alkylpolyglucoside 1 | 810 | | |
| Biosurfactant 2 + Alkylpolyglucoside 2 | 660 | | |
| Conventional Alkylpolyglucoside 1 (APG2) | 1029 | 221 | |
| Conventional Alkylpolyglucoside 2 (APG4) | 874 | 175 | |

As seen in Table 5, at 250° F. (121.1° C.), Biosurfactant 2 provided similar thickening time (98 minutes) relative to that (87, 89, 95 minutes) of Conventional Lignosulfonate Retarder at one half, one third, or one quarter (0.02 gallons per sack (gps)) the amount of the Conventional Lignosulfonate Retarder (0.04, 0.06, 0.8 gps). Additionally, retarder comprising conventional lignosulfonate retarder in combination with the Biosurfactant Retarders 1 and 2 of this disclosure had longer thickening time than the Biosurfactants alone.

TABLE 5

Thickening Times (min) for Example 2

| 250° F. (121.1° C.) Material | 0.08 gps(2x) | 0.06 gps(1.5x) | 0.04 gps(1x) | 0.02 gps(0.5x) |
|---|---|---|---|---|
| Conventional Lignosulfonate Retarder | 95 | 89 | 87 | |
| Biosurfactant 1 | | | 360 | 154 |
| Biosurfactant 2 | | | 140 | 98 |
| Conventional Lignosulfonate Retarder (0.04 gps) + Biosurfactant 1 | | | | 228 |
| Conventional Lignosulfonate Retarder (0.04 gps) + Biosurfactant 2 | | | | 143 |

As seen in Table 6, at 300° F. (148.9° C.), Biosurfactant 1 and Biosurfactant 2 provided usable thickening time at various concentrations, while the conventional lignosulfonate and alkylpolyglucoside retarders did not.

TABLE 6

Thickening Times (min) for Example 2

| 300° F. (148.9° C.) Material | 0.12 gps(3x) | 0.08 gps(2x) | 0.06 gps(1.5x) | 0.04 gps(1x) |
|---|---|---|---|---|
| Biosurfactant 1 | | >1440 | 660 | 216 |
| Biosurfactant 2 | 454 | 166 | | 112 |

As seen in Table 7, at 400° F. (204.4° C.), Biosurfactant 1 and Biosurfactant 2 provided usable thickening time at various concentrations, while the conventional lignosulfonate and alkylpolyglucoside retarders did not.

TABLE 7

| Thickening Times (min) for Example 2 | | | | |
|---|---|---|---|---|
| 400° F. (204.4° C.) Material | 0.12 gps(3x) | 0.06 gps(1.5x) | 0.04 gps(1x) | 0.02 gps(0.5x) |
| Biosurfactant 1 | | 570 | 136 | 67 |
| Biosurfactant 2 | 216 | | | |

Example 3: Thickening Time of Various Retarders at 140° F. (60° C.). In this Example 3, the thickening times of various cement compositions comprising conventional retarders or biosurfactant retarders (Biosurfactant 1, Biosurfactant 2) of this disclosure were studied. The results indicate that the biosurfactant retarders of this disclosure, as seen in Runs 2-8, will enable similar or enhanced thickening times relative to the thickening time seen in Run 1 for the conventional lignosulfonate retarder(s). Run 9 is a control that shows that the dispersant alone does not retard the thickening time.

TABLE 8

| 16.33 ppg, LaFarge H, Tap water (140° F. (60° C.), 8000 psi in 28 mins) | | | | | | |
|---|---|---|---|---|---|---|
| Run # | Gel Strength Modifier (gps) | Biosurfactant 2 (gps) | Biosurfactant 1 (gps) | Dispersant (BWOC) | Conventional Lignosulfonate Retarder 3 (BWOC) | Thickening Time (min) |
| 1 | 0.31 | 0 | 0 | 0 | 0.2 | 361 |
| 3 | 0 | 0.02 | 0 | 0 | 0 | 173 |
| 4 | 0 | 0.02 | 0 | 0.5 | 0 | 506 |
| 5 | 0 | 0.02 | 0 | 0.25 | 0 | 385 |
| 6 | 0 | | 0.02 | 0.25 | 0 | 606 |
| 7 | 0 | | 0.01 | 0.125 | 0 | 159 |
| 8 | 0 | | 0.015 | 0.125 | 0 | 325 |
| 9 | 0 | 0 | 0 | 0.125 | 0 | 197 |

Example 4: Thickening Time of Various Retarders at 94° F. (34.4° C.). In this Example 4, the thickening time of a cement composition comprising conventional retarder (Run 1) or biosurfactant retarder (Biosurfactant 2) (Run 2) of this disclosure were studied. The results indicate that the biosurfactant retarder of this disclosure, as seen in Run 2, will enable similar thickening time relative to the thickening time seen in Run 1 for the conventional lignosulfonate retarder(s) at one quarter the concentration of the retarder.

TABLE 9

| 16.4 ppg LaFarge H, Sea Water (94° F. (34.4° C.), 8122 psi) | | | | | | |
|---|---|---|---|---|---|---|
| | Salt (KCl) (lb/sk*) | Fluid Loss Additive (gps) | Suspension Aid (gps) | Conventional Lignosulfonate Retarder (gps) | Biosurfactant 2 (gps) | Thickening Time (min) |
| Run 1 | 1.86 | 0.12 | 0.02 | 0.04 | 0 | 203 |
| Run 2 | 1.86 | 0.12 | 0.02 | 0 | 0.01 | 220 |

*pounds per sack

Example 5: Thickening Time with Temperature. As noted hereinabove, the cement composition of this disclosure can exhibit a more predictable behavior to temperature than conventional cement compositions comprising conventional retarders (e.g., such as the secondary retarders noted herein, for example, lignosulfonate). For a certain percentage of the retarder added (e.g., 0.1%), the herein disclosed cement compositions can show a consistent reduction in thickening time with temperature, even as the slurry temperature crosses from 190° F. to above 200° F., which typically causes erratic behavior for conventional cement compositions.

Figure 6:
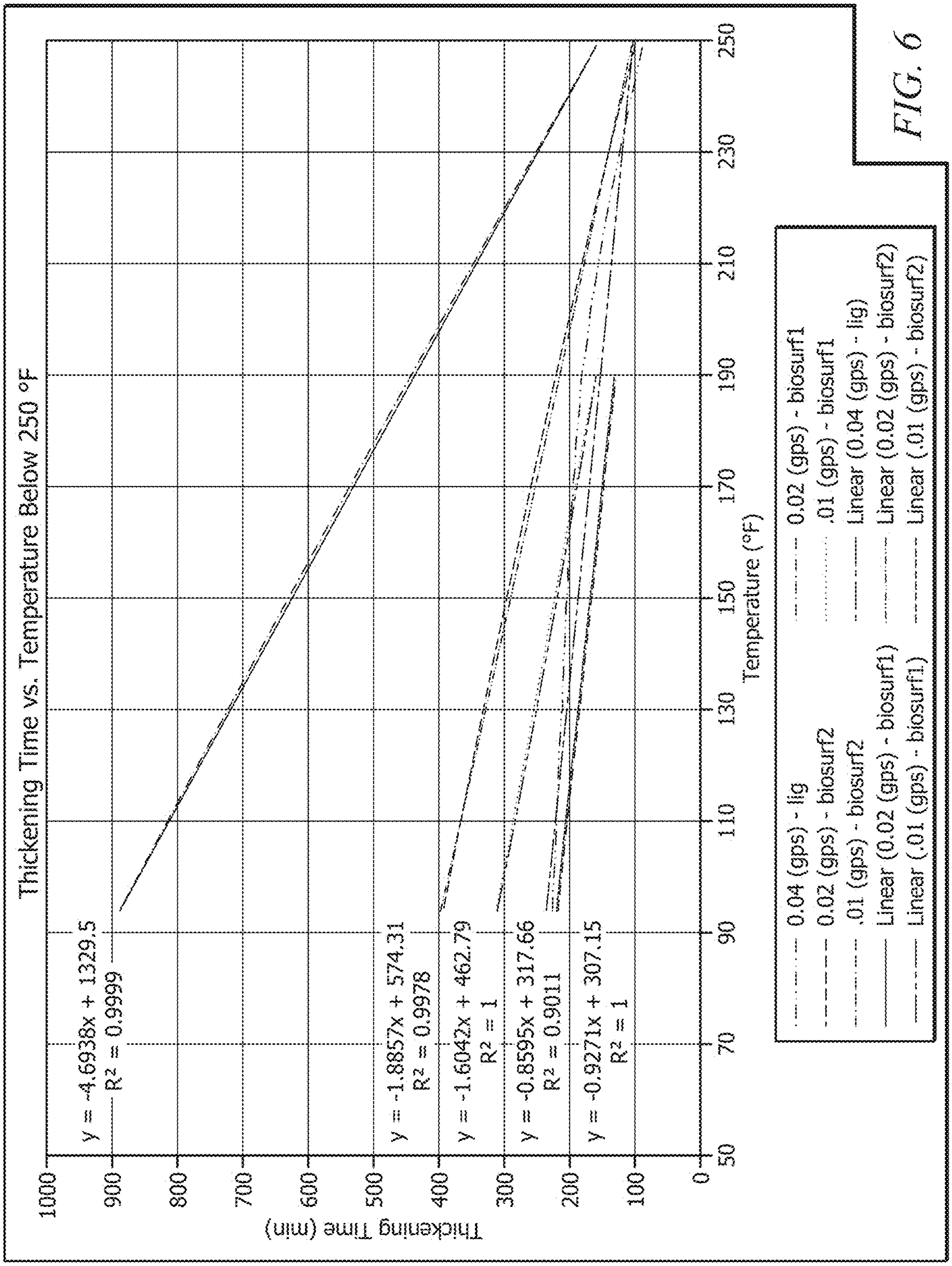
FIG. 6 is a plot of thickening time (min) vs. temperature (° F.) below 250° F. for the cement compositions of Example 5.
Figure 7:
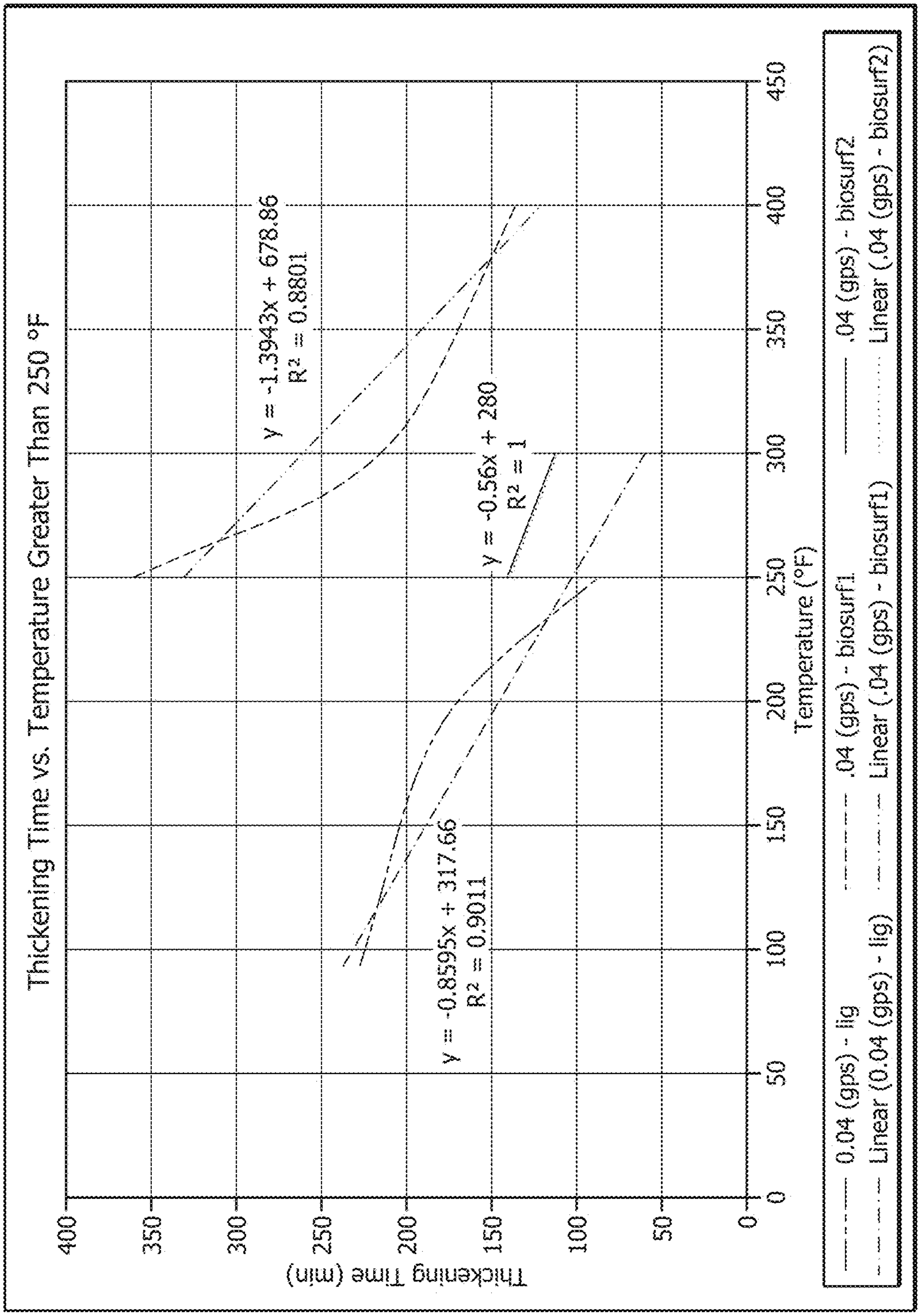
FIG. 7 is a plot of thickening time (min) vs. temperature (° F.) above 250° F. for the cement compositions of Example 5.
Figure 8:
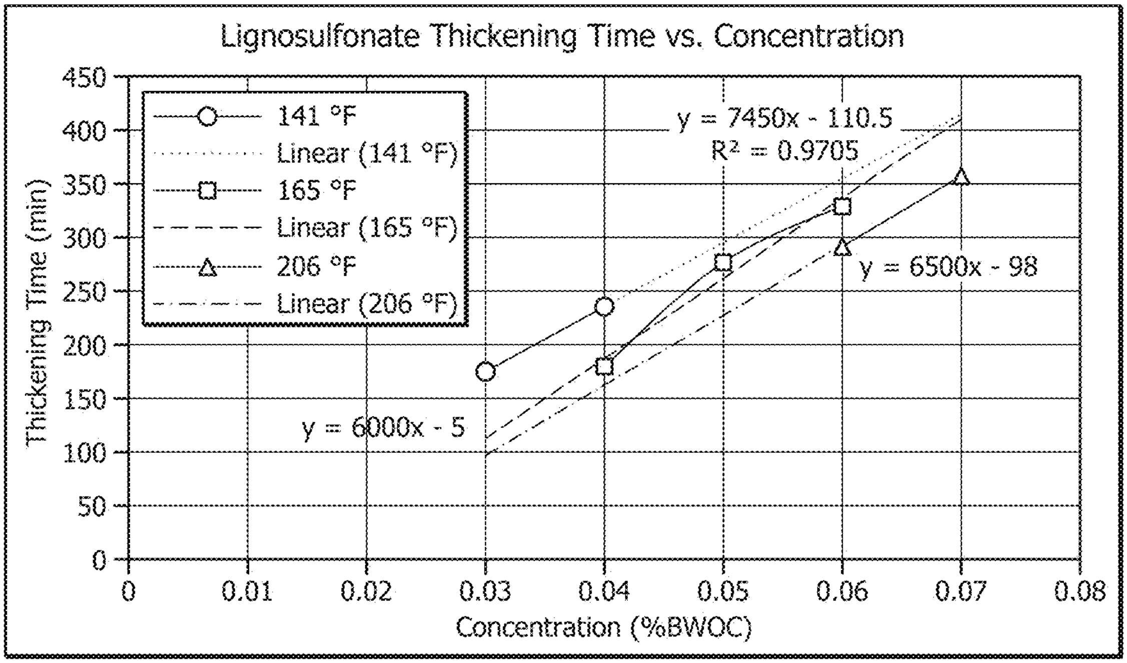
FIG. 8 is a plot of thickening time (min) vs. concentration (% BWOC) for the Comparative Cement Composition of Example 5.
Figure 9:
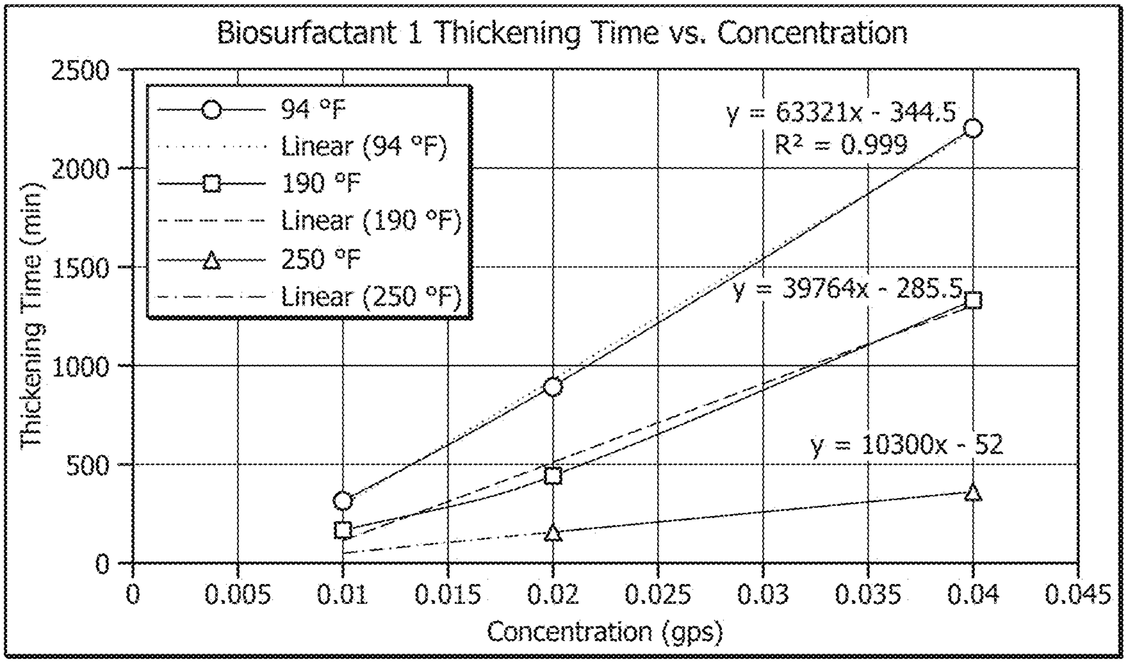
FIG. 9 is a plot of thickening time (min) vs. concentration gallons per sack (gps))) for Cement Composition 1 of Example 5 comprising Biosurfactant 1 according to this disclosure.
Figure 10:
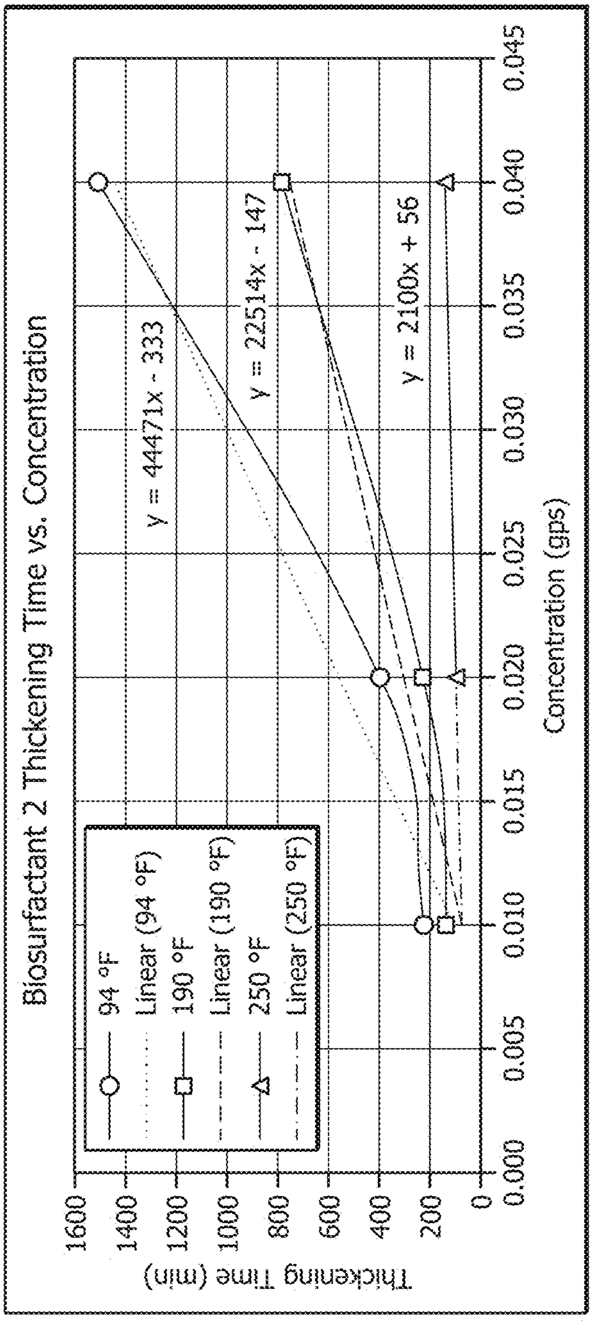
FIG. 10 is a plot of thickening time (min) vs. concentration (gps) for the comparative Cement Composition 2 of Example 5 comprising Biosurfactant 2 according to this disclosure.

Table 10 provides the thickening times (in minutes (min)) obtained for a Comparative Cement Composition comprising conventional lignosulfonate retarder, and two cements according to this disclosure comprising biosurfactant retarder. FIG. 6 is a plot of thickening time (min) vs. temperature (° F.) below 250° F. for the cement compositions of this Example 5; FIG. 7 is a plot of thickening time (min) vs. temperature (° F.) above 250° F. for the cement compositions of this Example 5; FIG. 8 is a plot of thickening time (min) vs. concentration (% BWOC) for the Comparative Cement Composition of this Example 5; FIG. 9 is a plot of thickening time (min) vs. concentration gallons per sack (gps))) for Cement Composition 1 of this Example 5 comprising Biosurfactant 1 according to this disclosure; and FIG. 10 is a plot of thickening time (min) vs. concentration (gps) for the Cement Composition 2 of this Example 5 comprising Biosurfactant 2 according to this disclosure. In FIGS. 6-10, "lig" and "Lignosulfonate" refer to the Comparative Cement Composition comprising lignosulfonate retarder, and "biosurf1" or "Biosurfactant 1" and "biosurf 2" or "Biosurfactant 2" respectively refer to the Cement Composition 1 comprising Biosurfactant 1 and Cement Composition 2 comprising Biosurfactant 2 according to this disclosure.

TABLE 10

| Thickening Times (in minutes) of Example 5 Comparative Cement Composition: | | | | | |
|---|---|---|---|---|---|
| Lignosulfonate Retarder Concentration (% BWOC) → | 0.03 | 0.04 | 0.05 | 0.06 | 0.07 |

TABLE 10-continued

| | | | | | |
|---|---|---|---|---|---|
| Thickening Times (in minutes) of Example 5 Comparative Cement Composition: | | | | | |
| Thickening Time at 141° F. → | 175 | 235 | | | |
| Thickening Time at 165° F. → | | 180 | 277 | 329 | |
| Thickening Time at 206° F. → | | | | 292 | 357 |
| Cement Composition 1 of this Disclosure Comprising Biosurfactant 1: | | | | | |
| Biosurfactant 1 Concentration (gps) → | 0.01 | 0.02 | 0.04 | 0.06 | |
| Thickening Time at 94° F. → | 312 | 887 | 2200 | | |
| Thickening Time at 190° F. → | 158 | 441 | 1328 | | |
| Thickening Time at 250° F. → | | 154 | 360 | | |
| Thickening Time at 300° F. → | | 67 | 136 | 570 | |
| Cement Composition 2 of this Disclosure Comprising Biosurfactant 2: | | | | | |
| Biosurfactant 2 Concentration (gps) → | 0.01 | 0.02 | 0.04 | | |
| Thickening Time at 94° F. → | 220 | 394 | 1500 | | |
| Thickening Time at 190° F. → | 131 | 224 | 780 | | |
| Thickening Time at 250° F. → | | 98 | 140 | | |

A plot of extension of thickening time with temperature for a cement composition of this disclosure having a given amount (e.g., 0.1%) of the biosurfactant retarder can thus be seen to have an increased slope relative to such a plot for a same cement composition comprising a conventional (e.g., lignosulfonate) retarder, which can be referred to as an increased potency of (e.g., the retarding capability of the) biosurfactant retarder to for equal loading. As seen in Table 10 and FIGS. 8-10, the biosurfactant concentration of cement compositions of this disclosure can be lowered to about one quarter relative to that of the conventional retarder of the Comparative Cement Composition to obtain a similar slope at temperatures under 250° F. Above 250° F., the conventional retarder can be ineffective at increasing the thickening time, even after doubling the concentration, while the biosurfactant retarder of this disclosure can continue to function even up to or above 190° F., 250° F., 300° F., or 400° F., in applications.

ADDITIONAL DISCLOSURE

The following are non-limiting, specific embodiments in accordance with the present disclosure:

In a first embodiment, a cement composition comprises: an aqueous fluid, a cement, and a cement retarder, wherein the cement retarder comprises a biosurfactant, and wherein the cement retarder is operable to retard cement thickening of the cement composition, relative to a same cement composition absent the cement retarder, over a temperature range of from about 40° F. (4.4° C.) to about 500° F. (260° C.), from about 40° F. (4.4° C.) to about 400° F. (204.4° C.), from about 50° F. (10° C.) to about 350° F. (176.7° C.), or from about 60° F. (15.6° C.) to about 250° F. (121.1° C.).

A second embodiment can include the cement composition of the first embodiment, wherein a thickening time of the cement composition, as measured by API RP Practice 10B-2, is increased by at least 0.5, 5, or 48 hours and/or at least 10, 15, 20, or 25% (e.g., at a temperature of greater than equal to about 250° F. (121.1° C.), 300° F. (148.9° C.), 325° F. (162.8° C.), 350° F. (176.7° C.), 375° F. (190.6° C.), 400° F. (204.4° C.), 425° F. (218.3° C.), 450° F. (232.2° C.), or 500° F. (260° C.)) relative to the same cement composition absent the cement retarder.

A third embodiment can include the cement composition of the first or second embodiment, wherein the cement retarder does not delay an onset of or shortens the onset of compressive strength (e.g., of 50, 500, or 1000 psi as measured via Ultrasonic Cement Analyzer (UCA) according to API Recommended Practice 10B-2/ISO 10426-2 section 7) relative to a same cement composition absent the cement retarder.

A fourth embodiment can include the cement composition of the third embodiment, wherein the cement retarder does not delay the onset of or shortens the onset of compressive strength (e.g., of 50, 500, or 1000 psi as measured via Ultrasonic Cement Analyzer (UCA) according to API Recommended Practice 10B-2/ISO 10426-2 section 7) relative to a same cement composition absent the retarder or does not delay or shortens the onset of the compressive strength as much as another cement composition, wherein the another cement composition has a thickening time within 5, 10, or 15% of the thickening time of the cement composition comprising the biosurfactant, and wherein the another cement composition is absent the biosurfactant and comprises a different cement retarder.

A fifth embodiment can include the cement composition of the fourth embodiment, wherein the cement composition comprises an amount of the cement retarder comprising the biosurfactant, wherein the another cement composition comprises an amount of the different cement retarder, and wherein the amount of the cement retarder comprising the biosurfactant is less than the amount of the different cement retarder.

A sixth embodiment can include the cement composition of the fifth embodiment, wherein the amount of the cement retarder comprising the biosurfactant is less 75%, 50%, or 25% of the amount of the different cement retarder.

A seventh embodiment can include the cement composition of any one of the fourth to sixth embodiments, wherein the different cement retarder comprises a conventional cement retarder selected from phosphonic acids (e.g., amino tris(methylene phosphonic acid), ethylenediamine tetra(methylene phosphonic acid), diethylenetriamine penta(methylene phosphonic acid)); lignosulfonates (e.g., sodium lignosulfonate, calcium lignosulfonate); salts (e.g., stannous sulfate, lead acetate, monobasic calcium phosphate), organic acids (e.g., citric acid, tartaric acid); cellulose derivatives (e.g., hydroxyl ethyl cellulose ("HEC"), carboxymethyl hydroxyethyl cellulose ("CMHEC")); synthetic co- or terpolymers comprising sulfonate and carboxylic acid groups (e.g., sulfonate-functionalized acrylamide-acrylic acid copolymers); borate compounds (e.g., alkali borates, sodium metaborate, sodium tetraborate, potassium pentaborate); derivatives thereof, or combinations thereof.

An eighth embodiment can include the cement composition of any one of the first to seventh embodiments, wherein the biosurfactant comprises a glycolipid.

A ninth embodiment can include the cement composition of any one of the first to eighth embodiments, wherein the biosurfactant is selected from sophorolipids, alkyl polyglycosides (APGs), other surface active glycolipids, derivatives and/or substituted forms thereof, subgroups thereof (e.g., lactonic sophorolipids), or combinations thereof.

A tenth embodiment can include the cement composition of any one of the first to ninth embodiments, wherein the biosurfactant comprises at least one sophorolipid.

An eleventh embodiment can include the cement composition of the tenth embodiment, wherein the at least one sophorolipid comprises an acidic form sophorolipid, a lactonic form sophorolipid, or a combination thereof.

A twelfth embodiment can include the cement composition of any one of the first to eleventh embodiments further comprising a secondary cement retarder selected from phosphonic acids (e.g., amino tris(methylene phosphonic acid), ethylenediamine tetra(methylene phosphonic acid), diethylenetriamine penta(methylene phosphonic acid)); lignosulfonates (e.g., sodium lignosulfonate, calcium lignosulfonate); salts (e.g., stannous sulfate, lead acetate, monobasic calcium phosphate), organic acids (e.g., citric acid, tartaric acid); cellulose derivatives (e.g., hydroxyl ethyl cellulose ("HEC"), carboxymethyl hydroxyethyl cellulose ("CMHEC")); synthetic co- or terpolymers comprising sulfonate and carboxylic acid groups (e.g., sulfonate-functionalized acrylamide-acrylic acid copolymers); borate compounds (e.g., alkali borates, sodium metaborate, sodium tetraborate, potassium pentaborate); derivatives thereof, or combinations thereof.

A thirteenth embodiment can include the cement composition of the twelfth embodiment, wherein the secondary retarder is selected from lignosulfonates.

A fourteenth embodiment can include the cement composition of any one of the first to thirteenth embodiments, wherein the cement retarder is present in the cement composition in an amount of about 0.1% to about 15% by weight of the cement.

A fifteenth embodiment can include the cement composition of any one of the first to fourteenth embodiments, wherein the cement is selected from Portland cements, pozzolanic cements, gypsum cements, high alumina content cements, silica cements, high alkalinity cements, slag cements, shale cements, cement kiln dust, or a combination thereof.

A sixteenth embodiment can include the cement composition of any one of the first to fifteenth embodiments further comprising an additive selected from foaming additives, strength-retrogression additives, lightweight additives, gas-generating additives, mechanical-property-enhancing additives, lost-circulation materials, fluid-loss-control additives, defoaming additives, thixotropic additives, or a combination thereof.

A seventeenth embodiment can include the cement composition of any one of the first to sixteenth embodiments, wherein the cement composition has a density in the range of from about 4 pounds per gallon to about 20 pounds per gallon.

In an eighteenth embodiment, a method for cementing in a subterranean formation comprises: providing a cement composition comprising an aqueous fluid, a cement, and a cement retarder, wherein the cement retarder comprises a biosurfactant, and wherein the cement retarder is operable to retard thickening of the cement composition, relative to a same cement composition absent the cement retarder, over a temperature range of from about 40° F. (4.4° C.) to about 500° F. (260° C.), from about 40° F. (4.4° C.) to about 400° F. (204.4° C.), from about 50° F. (10° C.) to about 350° F. (176.7° C.), or from about 60° F. (15.6° C.) to about 250° F. (121.1° C.); introducing the cement composition into a wellbore penetrating a subterranean formation; pumping the cement composition to a location within the wellbore; and allowing the cement composition to set at the location.

A nineteenth embodiment can include the method of the eighteenth embodiment, wherein a thickening time of the cement composition, as measured by API RP Practice 10B-2, is increased by at least 0.5, 5, or 48 hours and/or at least 10, 15, 20, or 25% (e.g., at a temperature of greater than equal to about 250° F. (121.1° C.), 300° F. (148.9° C.), 325° F. (162.8° C.), 350° F. (176.7° C.), 375° F. (190.6° C.), 400° F. (204.4° C.), 425° F. (218.3° C.), 450° F. (232.2° C.), or 500° F. (260° C.)) relative to the same cement composition absent the cement retarder.

A twentieth embodiment can include the method of the eighteenth or nineteenth embodiment, wherein the cement retarder does not delay an onset of or shortens the onset of compressive strength (e.g., of 50, 500, or 1000 psi as measured via Ultrasonic Cement Analyzer (UCA) according to API Recommended Practice 10B-2/ISO 10426-2 section 7) relative to a same cement composition absent the cement retarder.

A twenty first embodiment can include the method of the twentieth embodiment, wherein the cement retarder does not delay the onset of or shortens the onset of compressive strength (e.g., of 50, 500, or 1000 psi as measured via Ultrasonic Cement Analyzer (UCA) according to API Recommended Practice 10B-2/ISO 10426-2 section 7) relative to a same cement composition absent the retarder or does not delay or shortens the onset of the compressive strength as much as another cement composition, wherein the another cement composition has a thickening time within 5, 10, or 15% of the thickening time of the cement composition comprising the biosurfactant, and wherein the another cement composition is absent the biosurfactant and comprises a different cement retarder.

A twenty second embodiment can include the method of the twenty first embodiment, wherein the cement composition comprises an amount of the cement retarder comprising the biosurfactant, wherein the another cement composition comprises an amount of the different cement retarder, and wherein the amount of the cement retarder comprising the biosurfactant is less than the amount of the different cement retarder.

A twenty third embodiment can include the method of the twenty second embodiment, wherein the amount of the cement retarder comprising the biosurfactant is less 75%, 50%, or 25% of the amount of the different cement retarder.

A twenty fourth embodiment can include the method of any one of the twenty first to twenty third embodiments, wherein the different cement retarder comprises a conventional cement retarder selected from phosphonic acids (e.g., amino tris(methylene phosphonic acid), ethylenediamine tetra(methylene phosphonic acid), diethylenetriamine penta (methylene phosphonic acid)); lignosulfonates (e.g., sodium lignosulfonate, calcium lignosulfonate); salts (e.g., stannous sulfate, lead acetate, monobasic calcium phosphate), organic acids (e.g., citric acid, tartaric acid); cellulose derivatives (e.g., hydroxyl ethyl cellulose ("HEC"), carboxymethyl hydroxyethyl cellulose ("CMHEC")); synthetic co- or terpolymers comprising sulfonate and carboxylic acid groups (e.g., sulfonate-functionalized acrylamide-acrylic acid copolymers); borate compounds (e.g., alkali borates, sodium metaborate, sodium tetraborate, potassium pentaborate); derivatives thereof, or combinations thereof.

A twenty fifth embodiment can include the method of any one of the eighteenth to twenty fourth embodiments, wherein the biosurfactant comprises a glycolipid.

A twenty sixth embodiment can include the method of any one of the eighteenth to twenty fifth embodiments, wherein the biosurfactant is selected from sophorolipids, alkyl polyglycosides (APGs), other surface active glycolipids, derivatives and/or substituted forms thereof, subgroups thereof (e.g., lactonic sophorolipids), or combinations thereof.

A twenty seventh embodiment can include the method of any one of the eighteenth to twenty sixth embodiments, wherein the biosurfactant comprises at least one sophorolipid.

A twenty eighth embodiment can include the method of the twenty seventh embodiment, wherein the at least one sophorolipid comprises an acidic form sophorolipid, a lactonic form sophorolipid, or a combination thereof.

A twenty ninth embodiment can include the method of any one of the eighteenth to twenty eighth embodiments further comprising a secondary cement retarder selected from phosphonic acids (e.g., amino tris(methylene phosphonic acid), ethylenediamine tetra(methylene phosphonic acid), diethylenetriamine penta(methylene phosphonic acid)); lignosulfonates (e.g., sodium lignosulfonate, calcium lignosulfonate); salts (e.g., stannous sulfate, lead acetate, monobasic calcium phosphate), organic acids (e.g., citric acid, tartaric acid); cellulose derivatives (e.g., hydroxyl ethyl cellulose ("HEC"), carboxymethyl hydroxyethyl cellulose ("CMHEC")); synthetic co- or terpolymers comprising sulfonate and carboxylic acid groups (e.g., sulfonate-functionalized acrylamide-acrylic acid copolymers); borate compounds (e.g., alkali borates, sodium metaborate, sodium tetraborate, potassium pentaborate); derivatives thereof, or combinations thereof.

A thirtieth embodiment can include the method of the twenty ninth embodiment, wherein the secondary retarder is selected from lignosulfonates.

A thirty first embodiment can include the method of any one of the eighteenth to thirtieth embodiments, wherein the cement retarder is present in the cement composition in an amount of about 0.1% to about 15% by weight of the cement (bwoc).

A thirty second embodiment can include the method of any one of the eighteenth to thirty first embodiments, wherein the cement is selected from Portland cements, pozzolanic cements, gypsum cements, high alumina content cements, silica cements, high alkalinity cements, slag cements, shale cements, cement kiln dust, or a combination thereof.

A thirty third embodiment can include the method of any one of the eighteenth to thirty second embodiments further comprising an additive selected from foaming additives, strength-retrogression additives, lightweight additives, gas generating additives, mechanical-property-enhancing additives, lost-circulation materials, fluid-loss-control additives, defoaming additives, thixotropic additives, or a combination thereof.

A thirty fourth embodiment can include the method of any one of the eighteenth to thirty third embodiments, wherein the cement composition has a density in the range of from about 4 pounds per gallon to about 20 pounds per gallon.

In a thirty fifth embodiment, a system for cementing in a subterranean formation comprises: a cement composition comprising: an aqueous fluid, a cement, and a cement retarder, wherein the cement retarder comprises a biosurfactant, and wherein the cement retarder is operable to retard cement thickening of the cement composition, relative to a same cement composition absent the cement retarder, over a temperature range of from about 40° F. (4.4° C.) to about 500° F. (260° C.), from about 40° F. (4.4° C.) to about 400° F. (204.4° C.), from about 50° F. (10° C.) to about 350° F. (176.7° C.), or from about 60° F. (15.6° C.) to about 250° F. (121.1° C.), mixing equipment configured to mix the aqueous fluid, the cement, and the cement retarder to provide the cement composition, and pumping equipment configured to pump the cement composition into a wellbore penetrating a subterranean formation.

A thirty sixth embodiment can include the system of the thirty fifth embodiment, wherein the wellbore has a bottom hole temperature of greater than or equal to about 250° F. (121.1° C.), 300° F. (148.9° C.), 350° F. (176.7° C.), 400° F. (204.4° C.), 425° F. (218.3° C.), 450° F. (232.2° C.), or 500° F. (260° C.)).

A thirty seventh embodiment can include the system of the thirty fifth or thirty sixth embodiment, wherein a thickening time of the cement composition, as measured by API RP Practice 10B-2, is increased by at least 0.5, 5, or 48 hours and/or at least 10, 15, 20, or 25% (e.g., at a temperature of greater than equal to about 250° F. (121.1° C.), 300° F. (148.9° C.), 325° F. (162.8° C.), 350° F. (176.7° C.), 375° F. (190.6° C.), 400° F. (204.4° C.), 425° F. (218.3° C.), 450° F. (232.2° C.), or 500° F. (260° C.)) relative to the same cement composition absent the cement retarder.

A thirty eighth embodiment can include the system of any one of the thirty fifth to thirty seventh embodiments, wherein the cement retarder does not delay an onset of or shortens the onset of compressive strength (e.g., of 50, 500, or 1000 psi as measured via Ultrasonic Cement Analyzer (UCA) according to API Recommended Practice 10B-2/ISO 10426-2 section 7) relative to a same cement composition absent the cement retarder.

A thirty ninth embodiment can include the system of the thirty eighth embodiment, wherein the cement retarder does not delay the onset of or shortens the onset of compressive strength (e.g., of 50, 500, or 1000 psi as measured via Ultrasonic Cement Analyzer (UCA) according to API Recommended Practice 10B-2/ISO 10426-2 section 7) relative to a same cement composition absent the retarder or does not delay or shortens the onset of the compressive strength as much as another cement composition, wherein the another cement composition has a thickening time within 5, 10, or 15% of the thickening time of the cement composition comprising the biosurfactant, and wherein the another cement composition is absent the biosurfactant and comprises a different cement retarder.

A fortieth embodiment can include the system of the thirty ninth embodiment, wherein the cement composition comprises an amount of the cement retarder comprising the biosurfactant, wherein the another cement composition comprises an amount of the different cement retarder, and wherein the amount of the cement retarder comprising the biosurfactant is less than the amount of the different cement retarder.

A forty first embodiment can include the system of the fortieth embodiment, wherein the amount of the cement retarder comprising the biosurfactant is less 75%, 50%, or 25% of the amount of the different cement retarder.

A forty second embodiment can include the system of any one of the thirty ninth to forty first embodiments, wherein the different cement retarder comprises a conventional cement retarder selected from phosphonic acids (e.g., amino tris(methylene phosphonic acid), ethylenediamine tetra(methylene phosphonic acid), diethylenetriamine penta(methylene phosphonic acid)); lignosulfonates (e.g., sodium lignosulfonate, calcium lignosulfonate); salts (e.g., stannous sulfate, lead acetate, monobasic calcium phosphate), organic acids (e.g., citric acid, tartaric acid); cellulose derivatives (e.g., hydroxyl ethyl cellulose ("HEC"), carboxymethyl hydroxyethyl cellulose ("CMHEC")); synthetic co- or terpolymers comprising sulfonate and carboxylic acid groups (e.g., sulfonate-functionalized acrylamide-acrylic acid copolymers); borate compounds (e.g., alkali borates, sodium metaborate, sodium tetraborate, potassium pentaborate); derivatives thereof, or combinations thereof.

A forty third embodiment can include the system of ay one of the thirty fifth to forty second embodiments, wherein the biosurfactant comprises a glycolipid.

A forty fourth embodiment can include the system of any one of the thirty fifth to forty third embodiments, wherein the biosurfactant is selected from sophorolipids, alkyl polyglycosides (APGs), other surface active glycolipids, derivatives and/or substituted forms thereof, subgroups thereof (e.g., lactonic sophorolipids), or combinations thereof.

A forty fifth embodiment can include the system of any one of the thirty fifth to forty fourth embodiments, wherein the biosurfactant comprises at least one sophorolipid.

A forty sixth embodiment can include the system of the forty fifth embodiment, wherein the at least one sophorolipid comprises an acidic form sophorolipid, a lactonic form sophorolipid, or a combination thereof.

A forty seventh embodiment can include the system of any one of the thirty fifth to forty sixth embodiments, further comprising a secondary cement retarder selected from phosphonic acids (e.g., amino tris(methylene phosphonic acid), ethylenediamine tetra(methylene phosphonic acid), diethylenetriamine penta(methylene phosphonic acid)); lignosulfonates (e.g., sodium lignosulfonate, calcium lignosulfonate); salts (e.g., stannous sulfate, lead acetate, monobasic calcium phosphate), organic acids (e.g., citric acid, tartaric acid); cellulose derivatives (e.g., hydroxyl ethyl cellulose ("HEC"), carboxymethyl hydroxyethyl cellulose ("CMHEC")); synthetic co- or terpolymers comprising sulfonate and carboxylic acid groups (e.g., sulfonate-functionalized acrylamide-acrylic acid copolymers); borate compounds (e.g., alkali borates, sodium metaborate, sodium tetraborate, potassium pentaborate); derivatives thereof, or combinations thereof.

A forty eighth embodiment can include the system of the forty seventh embodiment, wherein the secondary retarder is selected from lignosulfonates.

A forty ninth embodiment can include the system of any one of the thirty fifth to forty eighth embodiments, wherein the cement retarder is present in the cement composition in an amount of about 0.1% to about 15% by weight of the cement (bwoc).

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=R1+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A cement composition comprising:
an aqueous fluid,
a cement, and
a cement retarder, wherein the cement retarder comprises a biosurfactant, wherein the biosurfactant comprises at least one sophorolipid, and wherein the cement retarder is operable to retard cement thickening of the cement composition, relative to a same cement composition absent the cement retarder, over a temperature range of from about 40° F. (4.4° C.) to about 500° F. (260° C.).

2. The cement composition of claim 1, wherein a thickening time of the cement composition, as measured by API RP Practice 10B-2, is increased by at least 10% relative to the same cement composition absent the cement retarder.

3. The cement composition of claim 1, wherein the cement retarder does not delay an onset of compressive strength relative to a same cement composition absent the cement retarder.

4. The cement composition of claim 3, wherein the cement retarder does not delay the onset of compressive strength relative to a same cement composition absent the retarder or does not delay the compressive strength as much as another cement composition, wherein the another cement composition is absent the biosurfactant and comprises a different cement retarder.

5. The cement composition of claim 4, wherein the cement composition comprises an amount of the cement retarder comprising the biosurfactant, wherein the another cement composition comprises an amount of the different cement retarder, and wherein the amount of the cement retarder comprising the biosurfactant is less than the amount of the different cement retarder.

6. The cement composition of claim 1, wherein the biosurfactant further comprises an alkyl polyglycoside (APGs).

7. The cement composition of claim 1, wherein the biosurfactant further comprises one or more alkyl polyglycosides (APGs), other surface active glycolipids, derivatives and/or substituted forms thereof, subgroups thereof, or combinations thereof.

8. The cement composition of claim 1, wherein the at least one sophorolipid comprises an acidic form sophorolipid, a lactonic form sophorolipid, or a combination thereof.

9. The cement composition of claim 1, wherein the at least one sophorolipid comprises an acidic form sophorolipid.

10. The cement composition of claim 1, wherein the at least one sophorolipid comprises a lactonic form sophorolipid.

11. The cement composition of claim 1, further comprising a secondary cement retarder selected from phosphonic acids; lignosulfonates; salts, organic acids; cellulose derivatives;

synthetic co-or terpolymers comprising sulfonate and carboxylic acid groups; borate compounds;

derivatives thereof, or combinations thereof.

12. A method for cementing in a subterranean formation, the method comprising:

providing the cement composition of claim 1;

introducing the cement composition into a wellbore penetrating a subterranean formation;

pumping the cement composition to a location within the wellbore; and allowing the cement composition to set at the location.

13. The method of claim 12, wherein a thickening time of the cement composition, as measured by API RP Practice 10B-2, is increased by at least 10% relative to the same cement composition absent the cement retarder.

14. The method of claim 12, wherein the cement retarder does not delay an onset of compressive strength relative to a same cement composition absent the cement retarder.

15. The method of claim 12, wherein the biosurfactant further comprises one or more alkyl polyglycosides (APGs), other surface active glycolipids, derivatives and/or substituted forms thereof, subgroups thereof, or combinations thereof.

16. The method of claim 12, wherein the at least one sophorolipid comprises an acidic form sophorolipid, a lactonic form sophorolipid, or a combination thereof.

17. A system for cementing in a subterranean formation, the system comprising:

the cement composition of claim 1, mixing equipment configured to mix the aqueous fluid, the cement, and the cement retarder to provide the cement composition, and pumping equipment configured to pump the cement composition into a wellbore penetrating a subterranean formation.

18. The system of claim 17, wherein the wellbore has a bottom hole temperature of greater than or equal to about 250° F. (121.1° C.).

19. The system of claim 17, wherein a thickening time of the cement composition, as measured by API RP Practice 10B-2, is increased by at least 10% relative to the same cement composition absent the cement retarder.

20. The system of claim 17, wherein the biosurfactant further comprises one or more alkyl polyglycosides (APGs), other surface active glycolipids, derivatives and/or substituted forms thereof, subgroups thereof, or combinations thereof.

* * * * *